United States Patent
Singh et al.

(10) Patent No.: US 11,922,382 B2
(45) Date of Patent: Mar. 5, 2024

(54) TRANSACTION SYSTEM HAVING A SERVERLESS ARCHITECTURE THAT PROVIDES MULTI-LANGUAGE MULTI-PLATFORM TRANSACTION SUPPORT FOR MULTIPLE VENDORS IN CONJUNCTION WITH A CLOUD-BASED COMPUTING PLATFORM

(71) Applicant: Salesforce, Inc., San Francisco, CA (US)

(72) Inventors: Prabhjot Singh, Union City, CA (US); Tarundeep Batra, Fremont, CA (US)

(73) Assignee: Salesforce, Inc.

( * ) Notice: Subject to any disclaimer, the term of this patent is extended or adjusted under 35 U.S.C. 154(b) by 781 days.

(21) Appl. No.: 16/774,411

(22) Filed: Jan. 28, 2020

(65) Prior Publication Data
US 2021/0233045 A1    Jul. 29, 2021

(51) Int. Cl.
G06Q 20/08 (2012.01)
G06F 9/50 (2006.01)
G06F 9/54 (2006.01)

(52) U.S. Cl.
CPC ....... G06Q 20/0855 (2013.01); G06F 9/5072 (2013.01); G06F 9/541 (2013.01)

(58) Field of Classification Search
CPC .... G06Q 20/0855; G06Q 20/14; G06Q 20/12; G06F 9/5072; G06F 9/541; G06F 9/547
USPC .......................................................... 705/78
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Zeshan Qayyum
(74) *Attorney, Agent, or Firm* — Lorenz & Kopf, LLP

(57) ABSTRACT

Technologies are provided for a cloud computing platform (CCP) to request a transaction via a third-party vendor and receive a transaction response result of that transaction from another cloud computing platform having a serverless capability such that at least part of the transaction occurs at the other cloud computing platform. A transaction request having a specific transaction type (TT) is sent to an adapter, which sends another call with the transaction request to the public cloud. The specific TT corresponds to a particular serverless function (SF) of the third-party vendor. A particular template t corresponds to the specific TT. The particular template is a code statement that follows a standard code definition written in the proprietary programming language of the CCP. The other cloud computing platform invokes the particular SF to generate a transaction response that is consumable by the CCP.

10 Claims, 10 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,649,861 B1* | 5/2020 | Natanzon ............... H04L 12/66 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0081685 A1* | 3/2014 | Thacker ............... G06F 16/245 |
| | | 705/7.12 |
| 2020/0220924 A1* | 7/2020 | Yang ............... H04L 67/1074 |
| 2021/0026692 A1* | 1/2021 | Mestery ............... H04L 61/4511 |
| 2021/0194971 A1* | 6/2021 | Thum ............... H04L 67/141 |

* cited by examiner

TRANSACTION SYSTEM HAVING A SERVERLESS ARCHITECTURE THAT PROVIDES MULTI-LANGUAGE MULTI-PLATFORM TRANSACTION SUPPORT FOR MULTIPLE VENDORS IN CONJUNCTION WITH A CLOUD-BASED COMPUTING PLATFORM

TECHNICAL FIELD

Embodiments of the subject matter described herein relate generally to cloud computing platforms, and more particularly, embodiments of the subject matter relate to a transaction system having a cloud computing platform having a serverless capability (e.g., a public cloud platform) and a serverless architecture that provides multi-language multi-platform transaction support for multiple vendors in conjunction with another cloud-based computing platform, and methods for implementing the same.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. "Cloud computing" services provide shared resources, software, and information to computers and other devices upon request. In cloud computing environments, software can be accessible over the Internet rather than installed locally on in-house computer systems. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. Cloud computing typically involves over-the-Internet provision of dynamically scalable and often virtualized resources. Technological details can be abstracted from the users, who no longer have need for expertise in, or control over, the technology infrastructure "in the cloud" that supports them. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application feature software between multiple sets of users.

In general, businesses use a customer relationship management (CRM) system (also referred to as a database system or system) to manage business relationships and information associated with the business relationship. For example, a multi-tenant system may support an on-demand CRM application that manages the data for a particular organization's sales staff that is maintained by the multi-tenant system and facilitates collaboration among members of that organization's sales staff (e.g., account executives, sales representatives, and the like). This data may include customer and prospect contact information, accounts, leads, and opportunities in one central location. The information may be stored in a database as objects. For example, the CRM system may include "account" object, "contact" object and "opportunities" object.

In some cases, a cloud computing platform that provides CRM applications and services may not provide an out-of-the-box, native transaction solutions for its massive client base to facilitate transactions with their customers through various types of transaction gateways that are external to the cloud computing platform. Examples of such transaction gateways can include, but are not limited to, payment gateways, billing gateways, sales gateways, purchase gateways, receipt gateways, accounting gateways, business gateways, financial gateways, trading gateways, banking gateways, etc. For instance, a cloud computing platform may not provide an out-of-the-box native payment solution so that clients can transact business with their customers through payment gateways (i.e., process payments from customers through payment gateways).

From the perspective of clients (e.g., vendors, merchants or any other service providers) can see this as a drawback of a cloud computing platform as there are hundreds of application service providers that provide the gateway functionality, and each provider has different APIs. As such, clients may be required to build integrations with each transaction gateway that they want to utilize, which is extremely time consuming and difficult to maintain. Another drawback of this approach is that there is no consistent data model used by the various clients (e.g., tenants or organizations) of the cloud computing platform. In other words, data models are not fixed and standardized among clients, which can make it difficult for client to integrate different gateways with the cloud computing platform. Furthermore, a client's transaction data may be spread across many different transaction gateways, which can be inconvenient for the client. In addition, there are different types of transaction gateways. This can make it difficult for clients to maintain records of business transactions in a multi-tenant database system, and clients may be forced to acquire data for transactions with a particular customer in many different ways at many different times during the lifecycle of a payment.

Another drawback of this approach from the perspective of clients of a cloud computing platform is that many cloud-based computing platforms implement their own proprietary programming languages. For instance, in the context for Saleforce.com® platform, payment vendors have to perform heavy APEX® implementation to get Salesforce.com® platform customers. Vendors such as Cybersource®, Paypal®, Payezee®, Strype®, Venmo®, etc. each have to write quite a lot of APEX® code to do following: understand billing request object and construct request payload, parse responses and add them to Saleforce.com objects, transform and massage data, error handling, etc. Dealing with an APEX® governor limit (limited memory, limited number of callouts and time available to process callouts) is also a challenge.

All the above actions need to happen for each transaction function that is exposed to customers of the vendors. For instance, in one payment interface, nine different payment transaction functions are exposed (e.g., authorization, capture, transaction status, void, sale, referenced refund, non-referenced refund, get token and void token). The process of implementing these functions is time-consuming (e.g., implementation time can take from 3-5 months) and expensive since vendors need to utilize third-party consultants who are skilled in implementing APEX® code.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
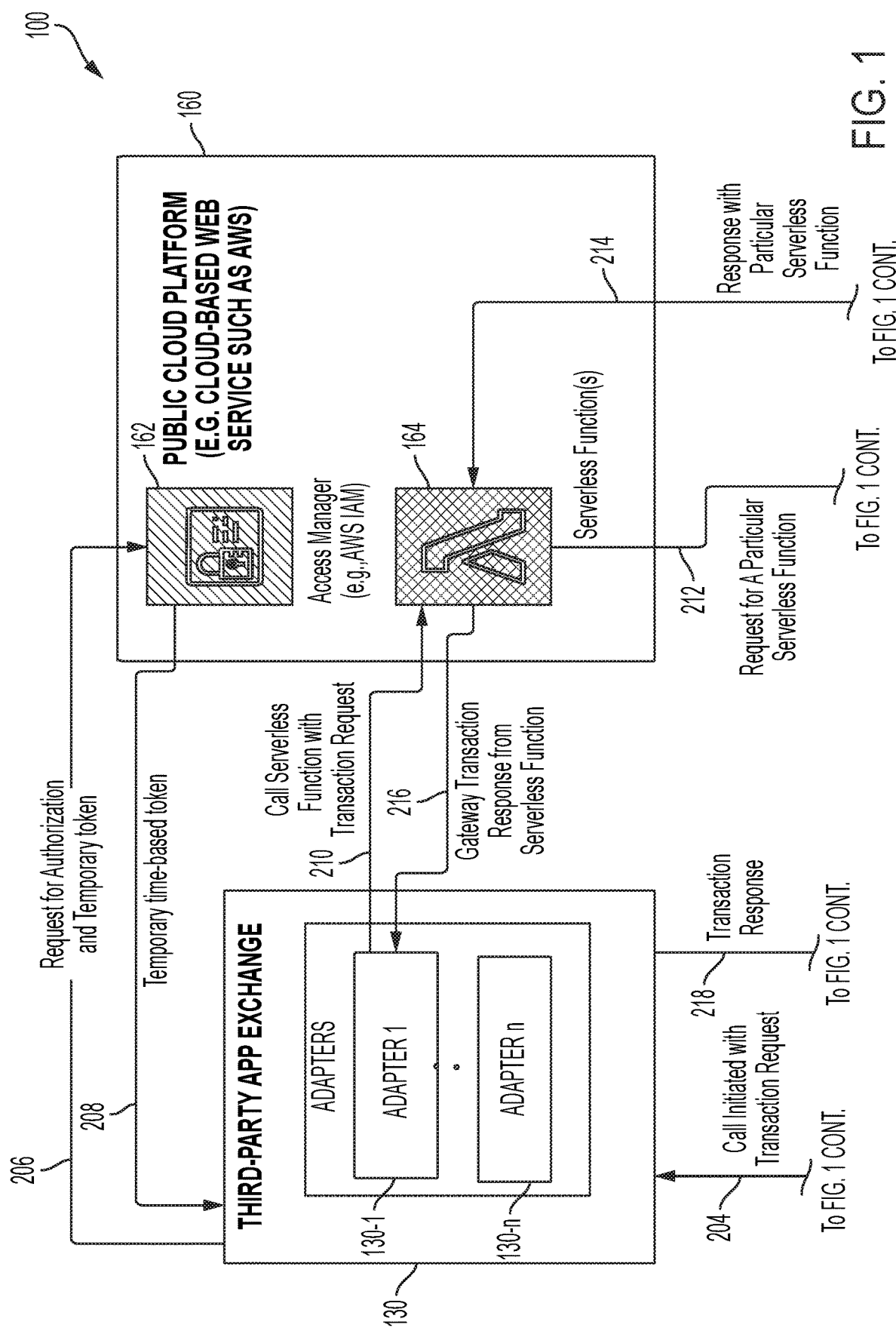
FIG. 1 is a block diagram that illustrates a transaction system in accordance with the disclosed embodiments.
Figure 1:
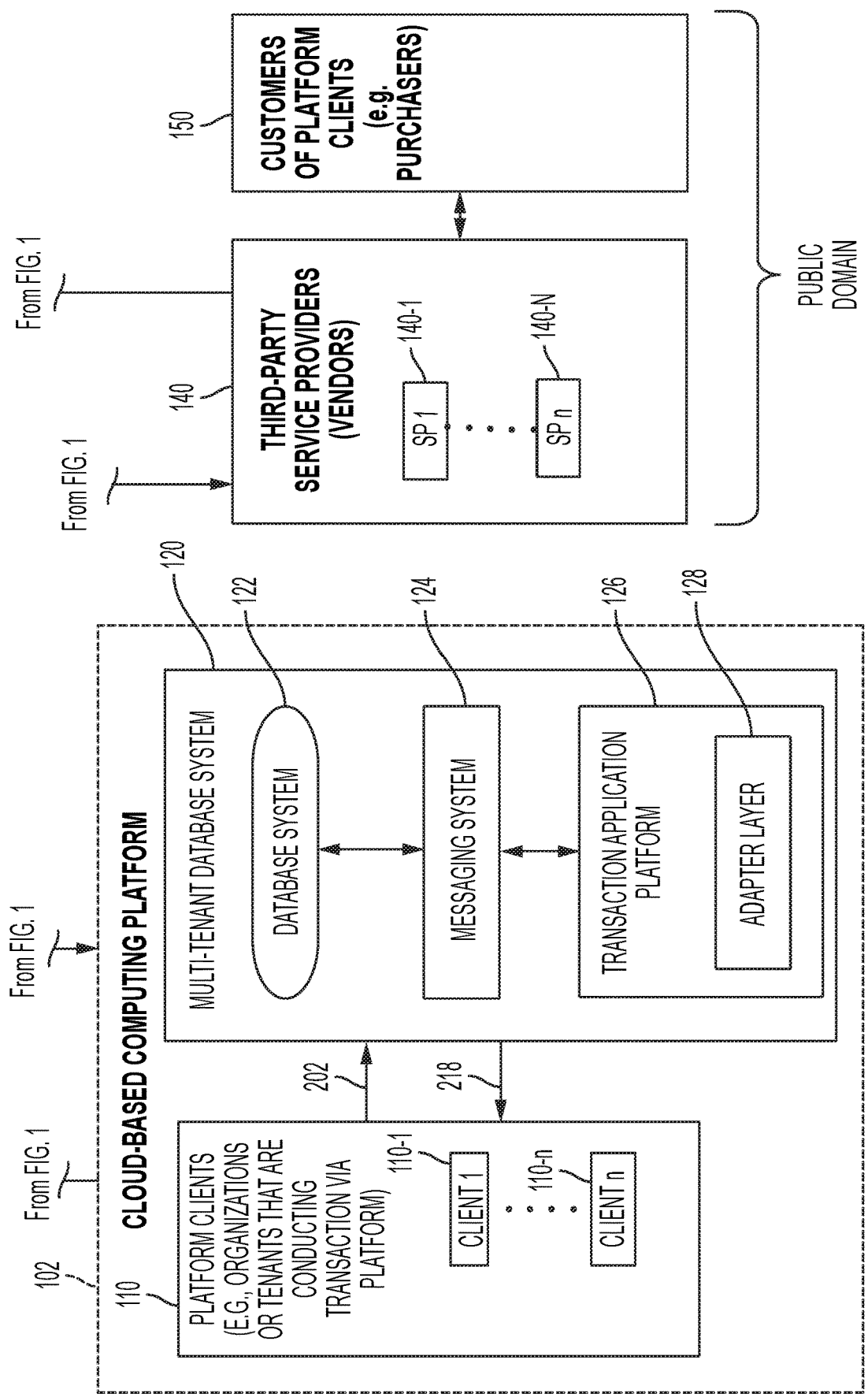

It would be desirable to provide a cloud computing platform, that provides clients with CRM applications and services, with a native platform that lets different clouds and client applications (e.g., Order Management System, Ecommerce Storefronts, Salesforce.org, Quotes to Cash, etc.) interact with different transaction gateways (including different types of transaction gateways) based on customer needs. For example, it would be desirable for the transaction gateways to be able to integrate their services with the cloud computing platform so that clients can transact business within the cloud computing platform. Having given that background information, the disclosed embodiments can provide a transaction method and system that interacts with another cloud computing platform having a serverless capability (e.g., a public cloud platform) having a serverless architecture that provides multi-language multi-platform transaction support for multiple vendors in conjunction with a cloud-based computing platform in accordance with the disclosed embodiments.

In one embodiment, a method and system are provided for requesting a transaction having a specific transaction type via a third-party vendor of a plurality of third-party vendors and returning a transaction response result of that transaction to a cloud computing platform from another cloud computing platform having a serverless capability (e.g., a public cloud or other transactional environment) that is independent of the cloud computing platform such that at least part of the transaction occurs at the other cloud computing platform. The other cloud computing platform having the serverless capability or architecture can allow a vendor to do programming outside the cloud computing platform. In response to a call (e.g., API call) from a client the cloud computing platform can initiate another call (referred to later as a "first" call) to send a transaction request to the public cloud for the transaction. In one implementation of this embodiment, in response to receiving the first call at the adapter, the adapter can re-use a temporary time-based token (that was previously provided from an access manager of the other cloud computing platform in response a previous authorization request from the adapter) that allows the adapter to communicate with the other cloud computing platform. In another implementation of this embodiment, where a temporary time-based token from the access manager is not already available, the adapter can send an authorization request to an access manager of the other cloud computing platform in response to receiving the first call at the adapter, and in response to receiving the authorization request the access manager can send a temporary time-based token to the adapter that allows the adapter to communicate with the other cloud computing platform. In one embodiment, an adapter can then send a second call to the other cloud computing platform that includes the transaction request for the transaction. In accordance with the disclosed embodiments, the specific transaction type corresponds to a particular serverless function of the third-party vendor. Each third-party vendor can create their own serverless functions. Each serverless function can correspond to a specific transaction type. Each of the templates can be exposed by an adapter layer of the cloud computing platform. The vendor code can be written, at least in part or even entirely, in any programming language (or any version of that programming language) other than a proprietary programming language of the cloud computing platform. Each of the plurality of templates corresponds to a different transaction type of a plurality of transaction types. Each particular template can be a code statement that follows a standard code definition written in the proprietary programming language of the cloud computing platform. A third-party vendor can integrate, for each of the different transaction types, the vendor code for that transaction type within a particular template corresponding to that transaction type to create integration code in the proprietary programming language, When executed, the integration code calls a corresponding serverless function that corresponds to a particular transaction type. In response to receiving the transaction request, the particular serverless function can be invoked at the other cloud computing platform to execute code for the specific transaction type to generate a transaction response that is directly consumable by the cloud computing platform. The transaction response includes a particular transaction response result that can be sent from the other cloud computing platform, via the adapter, to the cloud computing platform.

In one implementation of this embodiment, the third-party vendor can develop the vendor code for each of the different transaction types. The vendor code can be, for example, a function written, at least in part or even entirely, in any programming language (or any version of that programming language) other than a proprietary programming language of the cloud computing platform. In one implementation, the third-party vendor can be provided with access to documentation that provides information that allows the third-party vendor to develop a vendor written package, which has an adapter implementation via the plurality of templates exposed by the adapter layer of the cloud computing platform. The third-party vendor can integrate, for each different transaction type, the vendor code for that transaction type within a particular template corresponding to that transaction type to create integration code in the proprietary programming language. When executed, the integration code calls a corresponding serverless function that corresponds to a particular transaction type. The corresponding serverless function can be deployed at another cloud computing platform having a serverless capability. The corresponding serverless function can be invoked in response to a transaction request. This way, an adapter can, for example, call a URL for the corresponding serverless function to invoke it in the proprietary programming language of the cloud computing platform (e.g., by Salesforce.com's proprietary APEX® programming language passing in a request object and getting an appropriate response object back).

The serverless functions can be deployed and stored at the other cloud computing platform after integrating the vendor code for that transaction type within the particular template corresponding to that transaction type. Alternatively, the serverless functions can be deployed and stored at the other cloud computing platform in response to receiving a call (referred to herein as a "second" call) from the adapter at the other cloud computing platform that includes the transaction request. In this scenario, the other cloud computing platform can send a request for the particular serverless function to the third-party vendor, in which case the third-party vendor can send the particular serverless function to the other cloud computing platform for storage and use at the other cloud computing platform.

Figure 2:
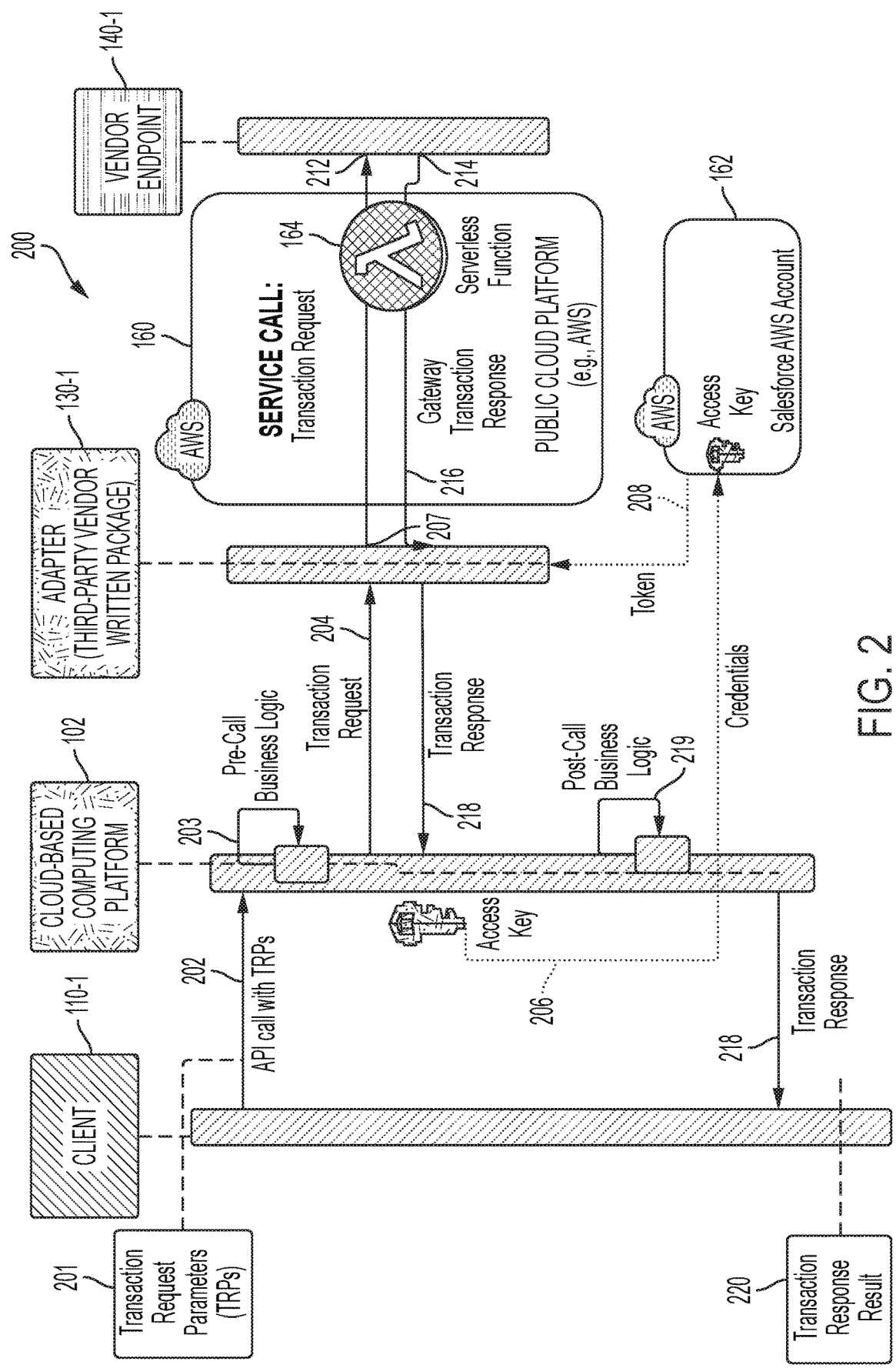
FIG. 2 is a flow diagram that illustrates a transaction method in accordance with the disclosed embodiments.

Transaction System for Use with a Cloud-Based Computing Platform and Providing Multi-Language Multi-Platform Transaction Support for Multiple Vendors FIG. 1 is a block diagram that illustrates a transaction system 100 in accordance with the disclosed embodiments. FIG. 2 is a flow diagram that illustrates a transaction method 200 in accordance with the disclosed embodiments. The method 200 of FIG. 2 will be described with reference to the system 100 of FIG. 1, where the same reference numerals in FIGS. 1 and 2 refer to the same elements or steps. The transaction system 100 includes a cloud-based computing platform 102 (e.g., Salesforce.com®) including platform clients 110 of the cloud-based computing platform 102 and a multi-tenant database system 120, a third-party application exchange 130 that includes a number of adapters 130-1 . . . 130-n, a number of third-party service providers 140-1 . . . 140-n (also referred to as vendors herein), customers 150 of the platform clients 110, and another cloud computing platform 160 having a serverless capability (referred to below as a public cloud platform 160 for simplicity) that is independent of the cloud-based computing platform 102. The multi-tenant database system 120 of the cloud-based computing platform 102 can include a database system 122, a messaging system 124, and a transaction application platform 126 that includes an adapter layer 128. The multi-tenant database system 120 can also include a number of other components that are not illustrated in FIG. 1 for sake of simplicity, but that will be described in greater detail below with reference to FIGS. 6-8.

In one embodiment, the messaging system 124 can be a communications platform as a service (CPaaS). A communications platform as a service (CPaaS) is a cloud-based delivery model that allows organizations to add real-time communication capabilities, such as voice, video and messaging, to business applications by deploying application program interfaces (APIs). The communication capabilities delivered by APIs can include Short Message Service (SMS), Multimedia Messaging Service (MMS), telephony and video. Communication services can be embedded into business applications, such as sales software, to add features such as notifications, click-to-call and multifactor authentication. In other words, CPaaS can be deployed by organizations that want to embed communications in their business applications, as well as cloud service providers and developers looking to add communications capabilities to their applications and services. The platforms include standards-based APIs, comprehensive software developer's kits, and APEX®, JAVA® or other libraries for building applications on various platforms.

As will be explained below, the system 100 can be used to request a transaction (e.g., such as a payment or billing transaction via a third-party vendor 140-1), and to then return a transaction response result of that transaction from another cloud computing platform having a serverless capability (referred to below as a public cloud platform 160) to a cloud-based computing platform 102 (e.g., Salesforce.com), where the public cloud platform 160 is independent of the cloud-based computing platform 102.

Cloud computing can refer to the delivery of computing services, including servers, storage, databases, networking, software, analytics, and intelligence, over the Internet (or "the cloud"). In general, the public cloud platform 160 can be any known cloud computing platform having a serverless capability (e.g., any computing service model architecture used for deploying cloud computing, and provisioning of storage and computational services to the general public over the Internet). A public cloud can include cloud resources (like servers and storage) that are owned and operated by a third-party cloud service provider and delivered over the Internet. With a public cloud, all hardware, software, and other supporting infrastructure is owned and managed by the cloud provider. In a public cloud, users can share the same hardware, storage, and network devices. Services can be accessed and managed using a web browser. Public cloud deployments are frequently used to provide web-based email, online office applications, storage, and testing and development environments.

As one non-limiting example, the public cloud platform 160 could be a cloud-based web service, such as, Amazon Web Services® (AWS®), which is a subsidiary of Amazon® that provides on-demand cloud computing platforms and APIs to individuals, companies, and governments, on a metered pay-as-you-go basis. In aggregate, these cloud computing web services provide a set of primitive abstract technical infrastructure and distributed computing building blocks and tools. One of these services is Amazon Elastic Compute Cloud, which allows users to have at their disposal a virtual cluster of computers, available all the time, through the Internet. AWS's version of virtual computers emulate most of the attributes of a real computer including, hardware central processing units (CPUs) and graphics processing units (GPUs) for processing, local/RAM memory, hard-disk/ SSD storage; a choice of operating systems; networking; and pre-loaded application software such as web servers, databases, customer relationship management (CRM), etc. The AWS technology is implemented at server farms throughout the world, and maintained by the Amazon subsidiary. Fees are based on a combination of usage, the hardware/OS/software/networking features chosen by the subscriber, required availability, redundancy, security, and service options. Subscribers can pay for a single virtual AWS® computer, a dedicated physical computer, or clusters of either. AWS® comprised more than 165 services (as of 2019) spanning a wide range including computing, storage, networking, database, analytics, application services, deployment, management, mobile, developer tools, and tools for the Internet of Things. The most popular include Amazon Elastic Compute Cloud (EC2) and Amazon Simple Storage Service (Amazon S3). Most services are not exposed directly to end users, but instead offer functionality through APIs for developers to use in their applications. Amazon Web Services' offerings are accessed over HTTP, using the REST architectural style and SOAP protocol. The public cloud platform 160 can be implemented using any other type of public cloud computing platform or deployment, such as, Microsoft Azure® Services Platform®, Google's Cloud Platform® and Google AppEngine®, IBM's Blue Cloud®, Sun Cloud®, etc.

Although the method 200 will be described with reference to a particular third-party vendor 140-1, it should be appreciated that the system 100 can include any number of third-party vendors 140 that can utilize the system 100 at any particular time. The types of vendors that can utilize the system 100 can vary depending on the implementation, and can generally be any entity that transacts business between clients 110 of the cloud-based computing platform 102 and customers 150 of those platform clients 110. For instance, a vendor could be any third-party in any business domain who needs integration with the cloud-based computing platform 102 (e.g., Salesforce.com®), while choosing to keep their code implementations and providing templates for users of the cloud-based computing platform 102 that allow that third party to easily integrate with the cloud-based computing platform 102 (e.g., Salesforce.com®) via use of serverless functions. For example, a third-party vendor can integrate, for each of the different transaction types, the vendor code for that transaction type within a particular template corresponding to that transaction type to create integration code in the proprietary programming language. When executed, the integration code calls a corresponding serverless function that corresponds to a particular transaction type. The vendors 140 can be service providers or transaction gateways. Examples of transaction gateways can include, for example, payment gateways, billing gateways, sales gateways, purchase gateways, receipt gateways, accounting gateways, business gateways, financial gateways, trading gateways, banking gateways, e-commerce gateways, order management systems, enterprise resource planning (ERP) systems, etc. There are hundreds or even thousands of application service providers that provide different transaction gateway functionality.

As used herein, the term "payment gateway" can refer a merchant service provided by an e-commerce application service provider that authorizes credit card or direct payments processing for e-businesses, online retailers, bricks and clicks, or traditional brick and mortar. The payment gateway may be provided by a bank to its client, but can be also provided as a separate service by a specialized financial service provider, such as a payment service provider. A payment gateway facilitates a payment transaction by the transfer of information between a payment portal (such as a website, mobile phone or interactive voice response service) and the front-end processor or acquiring bank. A payment gateway can, for example, facilitate communication between banks and help a merchant collect payments from a purchaser. It should be noted that a payment gateway differs from a payments processor in that a payment gateway is an intermediary between an online vendor and a payment processor that validates and then shares a transaction request to the payment processor, whereas a payment processor processes the payment request from the payment gateway and executes it (e.g., debits the money from the customer account and deposits it in a merchant account and then notifies the payment gateway about the transaction status (success or failed)). For instance, the system 100 can provide integration with payment gateways like PAYPAL®, STRIPE®, CYBERSOURCE®, ADVEN®, WORLD-PAY®, SECUREPAY.COME®, AUTHORIZE.NET®, 2CHECKOUT.COME®, AMAZON PAYMENTS®, FIRST DATA CORPORATION®, BLUEPAY PROCESSING LLC, PAYSIMPLE®, FASTCHARGE.COM®, PAYNOVA®, CHRONOPAY®, SQUARE®, etc. via standard APIs like authorization, authorization reversal, capture, sale, void, refund, etc. This can allow any one of the clients 110 to transact business through the platform 102 with their customers using any vendor 140.

The clients 110 of the cloud-based computing platform 102 can be organizations or tenants of the cloud-based computing platform 102 that are conducting transactions via the cloud-based computing platform 102. The clients 110 can include any number of clients 110-1 through 110-N, where N is any number greater than or equal to 2. Each of the clients 110 can be an organization or tenant of the cloud-based computing platform 102 that is transacting with customers 150. Organizations and tenants are described in greater detail below. The clients 110 can be, for example, vendors of products, goods or services who want to transact business with the customers 150 by selling them their products, goods or services. For instance, clients can be companies who sell a product or service to other businesses (or Business to Business (B2B)) customer personas; companies who sell a product or service to individual consumers (or Business to Consumer (B2C)) customer personas, etc.; billing gateways; order management entities, Configure, Price, Quote (CPQ) software used by companies to quickly and accurately generate quotes for orders. CPQ applications often work in tandem with CRM and ERP programs. Quotes produced with CPQ software are automated according to a preprogrammed set of rules, ensuring error-free pricing that takes into account quantities, discounts, customizations, and optional features of products. The customers 150 of those platform clients 110 can be, for example, purchasers of goods or services. Although not illustrated, the customers 150 can include any number of customers who transact business with clients 110 through the service providers 140-1 through 140-N. The customers can be, for example, purchasers of goods or services that are offered for sale by the client 110. As shown in FIG. 1, the customers 150 are entities that are in the public domain outside the cloud-based computing platform 102. Customers 150 can make payments to clients 110 using common payment methods such as credit cards, direct debit cards, gift cards (e.g., based on money or currency), rewards cards (e.g., based on points), Automated Clearing House (ACH) payments, digital wallets, mobile wallets, etc., as well custom payment methods.

Prior to the method 200 beginning, the third-party vendor 140-1 can develop, during a development phase, vendor code for each particular transaction type of a number of different transaction types. The vendor code is written, at least in part or even entirely, in any programming language (or any version of that programming language) other than a proprietary programming language of the cloud-based computing platform 102. For instance, the vendor code can be a function written, at least in part or even entirely, in any programming language (or any version of that programming language) other than a proprietary programming language of the cloud-based computing platform 102. As used herein, a transaction can refer to a sequence of information exchange and related work that is treated as a unit for the purposes of satisfying a request. Examples of transactions can include payment transactions, billing transactions, sales transactions, purchase transactions, receipt transactions, accounting transactions, business transactions, financial transactions, trading transactions, banking transactions, etc.

Integration Phase

During an integration phase, the third-party vendor 140-1 can be provided with access to documentation that provides information that allows the third-party vendor to develop a vendor written package via the cloud-based computing platform 102. The third-party vendor 140-1 can integrate, for each of the different transaction types, the vendor code for that transaction type within a particular template corresponding to that transaction type to create integration code in the proprietary programming language. When executed, the integration code calls a corresponding serverless function that corresponds to a particular transaction type The vendor written package can be a "managed package." For example, when the cloud-based computing platform 102 is Salesforce.com®, the package can be a collection of APEX® classes containing third-party vendor logic, Lightning® platform components and applications that are made available to vendors through the third-party app exchange 130. In some implementations, the package can also include images and text that describes package branding. In addition, as will be described below, the package can include a collection of templates that are posted as a unit via the third-party app exchange 130. Depending on the particular implementation, the third-party application exchange 130 can also be an entity that is in the public domain, or in the alternative, can be an entity that is part of the cloud-based computing platform 102. The third-party application exchange 130 can be an online, cloud-based, enterprise application marketplace in which applications and components are customized for the cloud-based computing platform 102. Applications can be written in APEX® programming language.

A managed package can refer to a collection of application components that are posted as a unit on the third-party app exchange 130, and are associated, for example, with a namespace and a License Management Organization. In one implementation, a managed package can refer to a container used by clients 110 of Salesforce.com® to distribute and sell applications. A managed package is a container that can include an individual component or a set of related apps. After creating a managed package, it can be distributed to other Salesforce.com® users and organizations. An organization can create a single managed package that can be downloaded and installed by many different organizations. Managed packages differ from unmanaged packages by having some locked components, allowing the managed package to be upgraded later. Unmanaged packages do not include locked components and cannot be upgraded.

The vendor written package for each vendor has an adapter 130-1 . . . 130-$n$ implementation via a plurality of templates that are exposed by an adapter layer 128 of the multi-tenant database system 120 of the cloud-based computing platform 102. In one implementation, each adapter can serve as, for example, an interface exposed by the cloud-based computing platform 102 which the vendors implement in the proprietary programming language of the cloud-based computing platform 102. For instance, when the cloud-based computing platform 102 is Salesforce.com®, each adapter 130-1 . . . 130-$n$ can be an APEX® interface exposed by Salesforce.com®, which the vendors implement in the APEX® programming language. Each of the templates corresponds to a particular transaction type of a plurality of different transaction types. Each template is a code statement that follows a standard code definition and is written in a proprietary object-oriented programming language of the cloud-based computing platform 102 (e.g., the APEX® programming language in the case where the cloud-based computing platform 102 is Salesforce.com®). For each particular transaction type, the third-party vendor 140-1 can integrate vendor code for that particular transaction type within a particular template that corresponds to that particular transaction type to create integration code in the proprietary programming language, When executed, the integration code calls a corresponding serverless function that corresponds to a particular transaction type The vendor code that has been integrated within the particular template can be deployed at another cloud computing platform (having a serverless capability) to invoke a corresponding serverless function 164 (e.g., a Lambda function when the public cloud platform 160 is AWS®). The corresponding serverless function 164 can be invoked in response to a transaction request. For example, an adapter can call a URL for the corresponding serverless function to invoke it in the proprietary programming language of the cloud computing platform (e.g., by Salesforce.com's proprietary APEX® programming language), provide the corresponding serverless function with a request object, and receive an appropriate response object back from the corresponding serverless function.

The platform disclosed herein can handle large volumes of data by employing a public cloud platform having a serverless architecture. A serverless architecture can refer to a software design pattern where applications are hosted by a third-party service, eliminating the need for server software and hardware management by the developer. In other words, serverless architectures with serverless or autonomous functions may be sometimes referred to as "Functions as a Service (FaaS)." Example embodiments may employ AMAZON® Web services and AMAZON® Lambda serverless computing. Other serverless architectures, such as GOOGLE® Cloud Functions and MICROSOFT® Azure®, may also be used to create the infrastructure disclosed herein. For instance, embodiments of the platform may utilize for example AMAZON® Web Service solutions, including AMAZON® Lambda®, AMAZON® S3, and AMAZON® Kinesis. Other embodiments may utilize analogous tools from services such as GOOGLE® Cloud Services or MICROSOFT® Azure®.

Serverless Architecture

A serverless architecture can consolidate and process streaming data. Streaming data can be data that can be generated continuously by multiple sources and processed simultaneously. A serverless architecture can collect and process the streaming data quickly and in a timely manner (e.g. substantially in real time), as the data is generated. This contrasts with gathering data, storing it in a database, and analyzing it later. A serverless architecture may have services specially designed to capture, transform, and analyze the data. These services may complement serverless functions to compress, encrypt, and convert streaming data into formats that are interoperable with different kinds of third-party applications.

Serverless functions may be implemented using a variety of programming languages, depending on which languages are supported by the underlying serverless architecture. Example languages include JavaScript®, Python®, Go®, Java®, C®, and Scala®. In a serverless architecture, applications can be broken up into individual "autonomous" functions, leveraging tools, such as AMAZON® Lambda Functions, Twilio® Functions, and Azure® Functions, that can be invoked and scaled individually. Serverless or autonomous functions are stateless containers that perform computing, which can be invoked and scaled individually operations when they are triggered in response to events. Serverless functions can enable the platform to perform many tasks, for example authentication, authorization, data consolidation, data transportation, data processing, and standardization, etc. Certain serverless functions can communicate with external application programming interfaces (APIs) and exchange, store, renew, and delete access tokens to manage application permissions. Some of the serverless functions can retrieve data from connected applications that push and pull data into the platform, and consolidate all of the collected data into streams. Other serverless functions can transport the streamed data to other components of the platform. Some other serverless functions can process the data by sorting the data, converting the data into different file formats, removing redundant data, and/or standardizing the data. Some other serverless functions can pre-process the data for storage and analysis.

An advantage of using serverless architectures such as those described herein is that they are easily scalable. Horizontal scaling, or adding additional resources, can be performed as resources are needed. For example, when the number of processed requests expands, the architecture can automatically procure additional computing resources. The ephemeral serverless functions can make scaling easier because they can be created and destroyed according to runtime need. Because the serverless architecture is standardized, it is easier to maintain if/when issues occur.

Another advantage of using serverless architectures is that serverless architectures can be cost-effective. Because serverless functions are ephemeral, computing power may only be used when a function is invoked. Thus, when a function is not being invoked, there is no charge for computing power. This pay structure has advantages when requests are only occasional, or when traffic is inconsistent. If a server is being run continuously, but only processes one request per minute, the server may be inefficient because the amount of time processing the request is low compared to the time the server is up and running. By contrast, with a serverless architecture, an ephemeral serverless function would use computing power to handle the request and remain dormant the rest of the time. When traffic is inconsistent, little computing power may be used when requests are infrequent. When traffic spikes, a large amount of computing power may be used. In a traditional environment, a hardware count may need to increase to handle the traffic spikes, but the hardware would be wasted when traffic dies down. However, in a serverless environment, flexible scaling allows for increased payment only during traffic spikes, and money savings during low-traffic periods.

Computing tasks performed by serverless functions may include storing data, triggering notifications, processing files, scheduling tasks, and extending applications. For example, a serverless function may receive a request as an application programming interface (API) call from a mobile application, inspect values belonging to parameters within the request, perform an operation based on the inspected values, producing an output, and store the output data in a database by modifying table entries within the database. Serverless functions may act as extensions of applications, retrieving data from the applications and posting the data to third party services for processing. Serverless functions may use computing power during one invocation or for a time period containing a limited number of invocations, instead of continuously using computing power. The serverless functions may be fully managed by the third-party service. Data may be streamed through the platform, and code processing may be performed only when processing functions are triggered by the streaming data. Such functions are generally known as "lambda functions". Using lambda functions in this manner can allow computing resources for processing data to be used more efficiently, because it does not require computing resources to be continuously running. The serverless architecture can enable large volumes of data to be efficiently processed by the platform disclosed herein. Employing a serverless architecture can permit the platform to process large volumes of data, for example on the order of $10^6$ data points per day, which may be distributed evenly or unevenly throughout a day. Using a serverless architecture is advantageous in mitigating the unpredictability associated with large fluctuations in data traffic, since server resources are utilized as and when needed, depending on incoming data flow.

Serverless Functions

As used herein, a "serverless function" (sometimes also referred to as an "autonomous function") can refer to a single-purpose, programmatic function that is hosted on managed infrastructure. Serverless functions, which are invoked through the Internet or other network, can be hosted and maintained by cloud computing companies, and are typically created by customers of cloud computing companies. Software developers can often provide their product code to serverless functions for reasons related to better code maintenance, low prices for hosting, and the peace of mind resulting from running them on managed infrastructure. For example, engineering teams within those companies ensure that the serverless functions have near-perfect uptime, redundant instances around the world, and scale to any incoming network request volume.

Serverless functions can be triggered in response to specific events, such as when data items are received or stored. Implementing the platform using a serverless architecture can also provide cost benefits, since charges may be incurred only when certain functions are called. Furthermore, the functions may run for a short period of time, which eliminates the costs associated with continuous processor usage. When data is not being received, the serverless functions need not be triggered, and thus processing costs are not incurred. Additional advantages of implementing the platform with a serverless architecture is that such architecture can permit scalability without incurring the costs associated using conventional server-based systems. As more data is processed by the serverless platform, the number of calls that trigger serverless functions for processing the data can increase. The additional costs are based on the increased number of function calls. Savings can be realized using the disclosed platform since investments in additional server resources, maintenance, or personnel can be obviated using a serverless architecture.

Code for serverless functions can have entirely stateless logic, so redundant instances do not cause inconsistencies for customers. A cloud hosting provider may have many points-of-presence around the globe. This means that the servers in which an application runs are nearest to all possible end users. The cloud hosting provider can redundantly deploy a serverless function to data centers around the world at the same time. This is good for a developer's customers because their client-side requests can be responded to with as little latency as possible. Networking logic can be implemented by the cloud provider. Cloud hosting providers that offer serverless functions can also benefit from automated code deployment with little or no chance of human error breaking a service during deployment. It allows for fast shipment of new code, with little effort. When many global data centers host a service, automation makes the whole deploy near-instant and more reliable. Serverless function hosting also requires no out of the box autoscaling. Software products like Kubernetes allow services to programmatically scale their infrastructure in an automated fashion. Whether it be scaling up, or scaling down, this new kind of "elastic" infrastructure makes hosting more efficient.

A serverless architecture as described herein can be a software design deployment where applications are hosted by a third-party services such as those provide by a public cloud platform. Examples of third-party services may include AMAZON® Web Services (AWS) Lambda, TWILIO® Functions, and MICROSOFT® Azure Functions, Google® Cloud Functions, etc. Typically, hosting a server application on the Internet requires managing a virtual or physical server, as well as the operating system and other web server hosting processes required to run the application. Hosting applications on third-party services in a serverless architecture transfers the burdens of server software and hardware management to the third-party services.

AWS Lambda is a serverless function environment on Amazon Web Services that supports programming languages include Java, Go, PowerShell, Node.js, C #, Python, and Ruby. Using Lambda functions is ideal in scenarios where on-demand compute is required (e.g., provide compute for operations like file processing or file conversion) and where a single-purpose API needs to fill in functionality for a platform (e.g., provide an HTTP endpoint for securely storing application data). Lambda functions may be serverless functions, as implemented using AMAZON® Lambda. These are functions that are triggered in response to events and are active when being called. These functions can reduce the amount of time that server resources need to be active. As a few examples, Lambda functions can be used to implement authentication, authorization, data transfer, processing, and storage functions. One or more of the aforementioned functions may be implemented using one or more Lambda functions. For example, a Lambda function may be used to authenticate an API gateway and request a token from an authorization server. Another Lambda function may be used to redirect an authorized API to a URL. Additional Lambda functions may issue, refresh, and delete tokens. Similarly, different Lambda functions may be used to pull or push data, consolidate the pulled and pushed data, and direct different data items from the stream to different places. Lambda functions can integrate with many types of AMAZON® objects, including data streams, data storage, and streaming applications.

Azure Functions is a serverless function environment on Microsoft Azure that supports programming languages such as C #, JavaScript, F #, Java, Python, and TypeScript (transpiled JS). Google Cloud Functions provide a serverless function environment on Google Cloud Platform that interacts succinctly with other Google Cloud Services and client applications, and supports programming languages such as JavaScript, Python, and Go. Google Cloud Functions provide serverless compute works well in scenarios where data processing is key (e.g., like retrieving relevant data from images and videos).

Serverless Architecture that Provides Multi-Language Multi-Platform Transaction Support for Multiple Vendors The disclosed embodiments can implement a serverless architecture that will provide vendors with the ability to develop code in any programming language (or any version of that programming language) and deploy it via a public cloud-based infrastructure (e.g., a public cloud platform). For instance, a cloud-based computing platform 102 (e.g., Salesforce.com) exposes a simple APEX® service interface with multiple functions. APEX® is a proprietary language developed by Salesforce.com® that allows clients 110 of Salesforce.com® clients to deliver additional functionality on top of Salesforce.com® platform. APEX® is a strongly typed, object-oriented programming language that allows developers to execute flow and transaction control statements on Salesforce® servers in conjunction with calls to the API. Using syntax that looks like JAVA® and acts like database stored procedures, APEX® enables developers to add business logic to most system events, including button clicks, related record updates, and Visualforce pages. APEX® code can be initiated by Web service requests and from triggers on objects. APEX® provides built-in support for common Lightning® Platform idioms, including: data manipulation language (DML) calls, such as INSERT, UPDATE, and DELETE, that include built-in DmlException handling; inline Salesforce Object Query Language (SOQL) and Salesforce Object Search Language (SOSL) queries that return lists of sObject records; looping that allows for bulk processing of multiple records at a time; locking syntax that prevents record update conflicts; custom public API calls that can be built from stored APEX® methods; warnings and errors issued when a user tries to edit or delete a custom object or field that is referenced by APEX®. APEX® is based on familiar JAVA® idioms, such as variable and expression syntax, block and conditional statement syntax, loop syntax, object and array notation. Where APEX® introduces new elements, it uses syntax and semantics that are easy to understand and encourage efficient use of the Lightning Platform. Therefore, APEX® produces code that is both succinct and easy to write. APEX® is designed to thread together multiple query and DML statements into a single unit of work on the Salesforce server. Developers use database stored procedures to thread together multiple transaction statements on a database server in a similar way. Like other database stored procedures, APEX® does not attempt to provide general support for rendering elements in the user interface. APEX® is a strongly typed language in that it uses direct references to schema objects such as object and field names. It fails quickly at compile time if any references are invalid. It stores all custom field, object, and class dependencies in metadata to ensure that they are not deleted while required by active APEX® code. APEX® can be interpreted, executed, and controlled entirely by the Lightning Platform.

Like the rest of the Lightning® Platform, APEX® runs in a multitenant environment. So, the APEX® runtime engine is designed to guard closely against runaway code, preventing it from monopolizing shared resources. Any code that violates limits fails with easy-to-understand error messages. APEX® provides built-in support for unit test creation and execution. It includes test results that indicate how much code is covered, and which parts of your code could be more efficient. Salesforce ensures that all custom APEX® code works as expected by executing all unit tests prior to any platform upgrades. APEX® code can be saved against different versions of the API.

Vendors can implement the above service interface functions a cloud-based computing platform that utilizes a proprietary programming language (e.g., APEX® for Salesforce.com) can consume them. That way, systems that are part of the cloud-based computing platform can know which function to call in which scenario. The cloud-based computing platform 102 (e.g., Salesforce.com) creates an account on each public cloud platform 160 that it supports (e.g., AWS, Google Public Cloud, Azure, etc.) The cloud-based computing platform 102 also creates a user in each public cloud platform 160, and the user will automatically be assigned a platform wide ID (e.g., ARN in case for AWS) with appropriate access and policies. Each public cloud platform 160 can host a number of serverless functions 164. In accordance with the disclosed embodiments, a third-party vendor can integrate, for each of the different transaction types, the vendor code for that transaction type within a particular template corresponding to that transaction type to create integration code, When executed, the integration code calls a corresponding serverless function that corresponds to a particular transaction type. Each serverless function corresponds to a particular transaction type. The vendor code can be integrated within a particular template of a plurality of templates exposed by an adapter layer 128 of the cloud-based computing platform 102. One example implementation is shown below, which illustrates a standard boilerplate APEX® code definition that can be used within the context of a Salesforce.com platform:
TransactionResultcapture(TransctionRequestParameterObjectobj){TransactionResponseResult obj=(TransactionResponseResult) SFDC.AWS Service.ARNCall(arn:aws:lambda:us-east-1:123456789012:function:ProcessCapture);
//Rather than ProcessCapture one can call AnyCalFunction return obj;}

For each unique transaction, a vendor can create different integration code that can be used to call a corresponding serverless function (e.g., like ProcessCapture, ProcessVoid, ProcessRefund, etc.) Using this APEX® code structure, a vendor can write each function for each type of transaction. The vendor can implement and write the code in any programming language of their choice like Java®, Node.js®, Python®, etc. (or any version of that programming language), and therefore, will be able to reuse or repurpose their existing on-premise codebase without learning the intricacies of the proprietary programming language utilized by the cloud-based computing platform (e.g., the Salesforce APEX® language in the case of Salesforce.com).

For example, a vendor can write the integration code for capture( ), A Lambda function, say LambdaCapture( ), can be deployed in the vendor's public could platform (e.g., AWS). The cloud-based computing platform 102 (e.g., Salesforce.com) will be able to call this function, submit a request and get a response (that includes transaction results) from it. This way the vendor completely manages and owns their code, and will provide access to the Lambda Capture( ) arn by a Salesforce billing-user. This approach can provide a number of benefits. For instance, there is no need to store named credentials (endpoint management) because authorization is handled directly by the public cloud platform(s) 160. As such, security issues are simplified. In addition, serverless functions 164 (e.g., Lambda functions) of each vendor are completely owned, managed, and upgraded by the vendors. The vendors can still market, and manage APEX versions and branding of the package, but do not need to write any complex code (e.g., the proprietary programming language utilized by the cloud-based computing platform). The vendors can publish their functions on the public cloud platform of their preference. The vendors can write the functions in the language of their preference (e.g., Node.js, Python, Java, Ruby, C #, Go PowerShell, etc.). This also helps boost performance and security, while providing a highly scalable system.

As noted above, the vendor code can be written (at least in part or even entirely) in any programming language (or any version of that programming language) other than a proprietary programming language of the cloud-based computing platform 102 (or any version of that programming language). Each of the plurality of templates corresponds to a particular transaction type (of a plurality of transaction types). Each particular template is a code statement that follows a standard code definition and is written in the proprietary programming language of the cloud computing platform. Many serverless functions 164 can be deployed to and stored at the public cloud platform 160 during the integration phase (e.g., after integrating the vendor code for that particular transaction type within a particular template corresponding to that particular transaction type). However, as will be described below, in some cases certain serverless functions 164 can be deployed at the public cloud platform 160 during a transaction phase by requesting serverless functions 164 from specific vendors 140-1 . . . 140-n.

Transaction Phase

The transaction phase can start, for example, when an API call is made (at 202) by a particular client 110-1 to the cloud-based computing platform 102. The API call 202 that includes transaction request parameters (TRPs) 201. API calls represent specific operations that client applications can invoke at runtime to perform tasks (e.g., query data in an organization; add, update, and delete data; obtain metadata about other data; run utilities to perform administration tasks). For example, a client application can prepare and submit a service request to the Lightning® Platform Web Service via an API, the Lightning® Platform Web Service processes the request and returns a response, and the client application then handles the response.

In general terms, the transaction request parameters can specify parameters for a transaction. For instance, for a sales transaction examples of transaction request parameters can specify such as gateway name, customer details (e.g., first name, last name, mailing address, email address, phone number), amount charged, payment information (e.g., card number, card type, card expiration date, etc. The transaction request parameters that are specified depend on the type of transaction gateway and the type of transaction and can vary the implementation of that transaction. Some examples of type of transaction gateways can include, for example, payment gateways, billing gateways, sales gateways, purchase gateways, receipt gateways, accounting gateways, business gateways, financial gateways, trading gateways, banking gateways.

For example, when the vendor is a payment gateway, the types of transaction can include an authorization request, an authorization reversal request, a capture request, a sale request, a void request, or a refund request, etc. (as summarized below with reference to FIG. 5). For instance, the TRPs for a refund transaction could include gateway name, amount to refund, previous payment id to refund from, extra information about the item user is requesting a refund for like category, etc.

In response to the API call 202 from the particular client 110-1, the cloud-based computing platform 102 can optionally perform pre-call business logic (at 203), and initiate a first call to send a transaction request 204 (e.g., for a transaction having a first transaction type) from the cloud-based computing platform 102 to a particular adapter 130-1 that is deployed at the third-party application exchange 130. In one embodiment, in response to receiving the first call at the adapter 130-1, the adapter 130-1 can send an authorization request 206 to an access manager 162 of the public cloud platform 160. In response to receiving the authorization request 206, the access manager 162 can send a temporary time-based token 208 back to the adapter 130-1. The temporary time-based token 208 allows or authorizes the adapter 130-1 to communicate with the public cloud platform 160.

The access manager 162 can be any identity and access management service. In one non-limiting implementation, the access manager 162 can be implemented using AWS identity and access management (IAM). AWS IAM can be used to manage access to AWS services and resources securely. Using IAM, AWS users and groups can be created and managed, and permissions can be used to allow and deny their access to AWS resources. For example, users can be created in IAM, and assigned individual security credentials (in other words, access keys, passwords, and multi-factor authentication devices), or they can request temporary security credentials to provide users access to AWS services and resources. Permissions can be managed in order to control which operations a user can perform. Roles can be created in IAM and permissions can be managed to control which operations can be performed by the entity, or AWS service, that assumes the role. Service-linked roles can be used to delegate permissions to AWS services that create and manage AWS resources. Identity federation can be enabled to allow existing identities (users, groups, and roles) in an enterprise to access the AWS Management Console, call AWS APIs, and access resources, without the need to create an IAM user for each identity.

Referring again to FIGS. 1 and 2, after authorization is complete, the adapter 130-1 can send another call (at 210) to the public cloud platform 160 to invoke a particular serverless function 164. This call (sent at 210) includes the original transaction request 204 for a transaction having a certain transaction type. The original transaction request 204 includes transaction request parameters for a certain transaction type that corresponds to a particular serverless function 164 of a particular third-party vendor 140-1. As noted above, each vendor may deploy many different serverless functions 164 at the public cloud platform 160 during the integration phase so they are already present at the public cloud platform 160 when the transaction request 204 (from an adapter 130-1) is received at the public cloud platform 160. However, in other cases, a particular serverless function may not be present at the public cloud platform 160 when the transaction request 204 is received at the public cloud platform 160 from an adapter 130-1, in which case, the particular serverless function can be requested (at 212) from a specific vendor 140-1 . . . 140-n during the transaction phase. In that scenario, the public cloud platform 160 can request a particular serverless function 164 from a specific vendor 140-1 . . . 140-n (at 212), and the vendor can then provide (at 214) that particular serverless function 164 to the public cloud platform 160 where it is deployed to process the transaction request 204. As such, in response to receiving the call 210 that includes the transaction request 204, the public cloud platform 160 can send a request (at 212) for the particular serverless function to a specific one of the third-party vendors 140, and that third-party vendor can send (at 214) the particular serverless function to the public cloud platform 160 for storage and use at the public cloud platform 160.

Regardless of how the particular serverless function is deployed at the public cloud platform 160, the public cloud platform 160 can then invoke the particular serverless function 164 to execute code to process the transaction request 204 for the particular transaction type to generate a gateway transaction response (that is sent at 216) that is sent to one of the adapters 130, which is shown as adapter 130-1 in this particular non-limiting example. The gateway transaction response (sent at 216) includes a particular transaction response result. The gateway transaction response is capable of being directly consumed by the cloud-based computing platform 102. At 218, adapter 130-1 can then forward the transaction response to the cloud-based computing platform 102, which can in turn forward the transaction response to the appropriate client 110 of the platform 102, which is client 110-1 in this particular non-limiting example. The transaction response includes the transaction response result 220.

Figure 3:
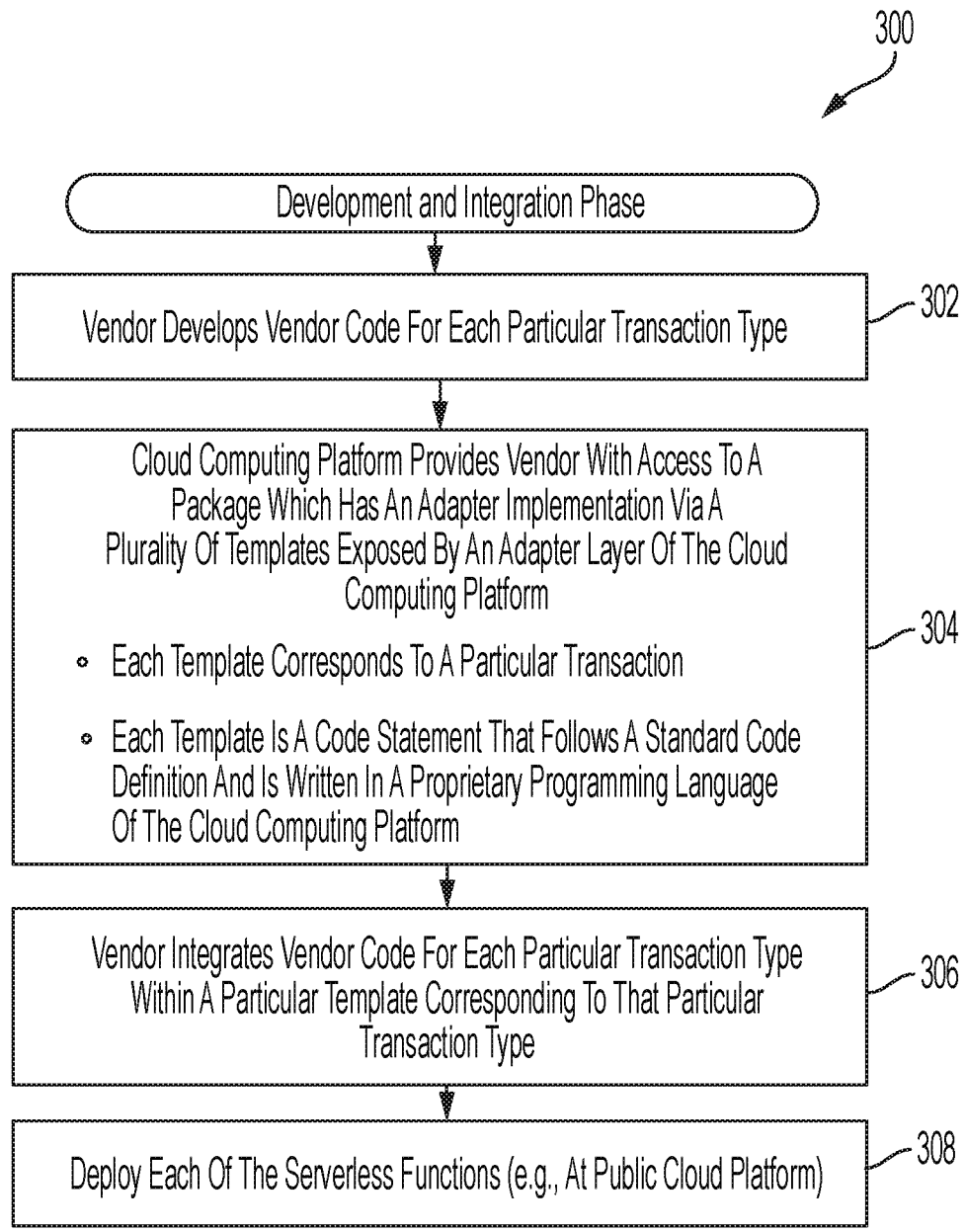
FIG. 3 is a flow chart that illustrates a development and integration method for developing and deploying serverless functions to another cloud computing platform having a serverless capability (e.g., a public cloud platform) in accordance with the disclosed embodiments.
Figure 4:
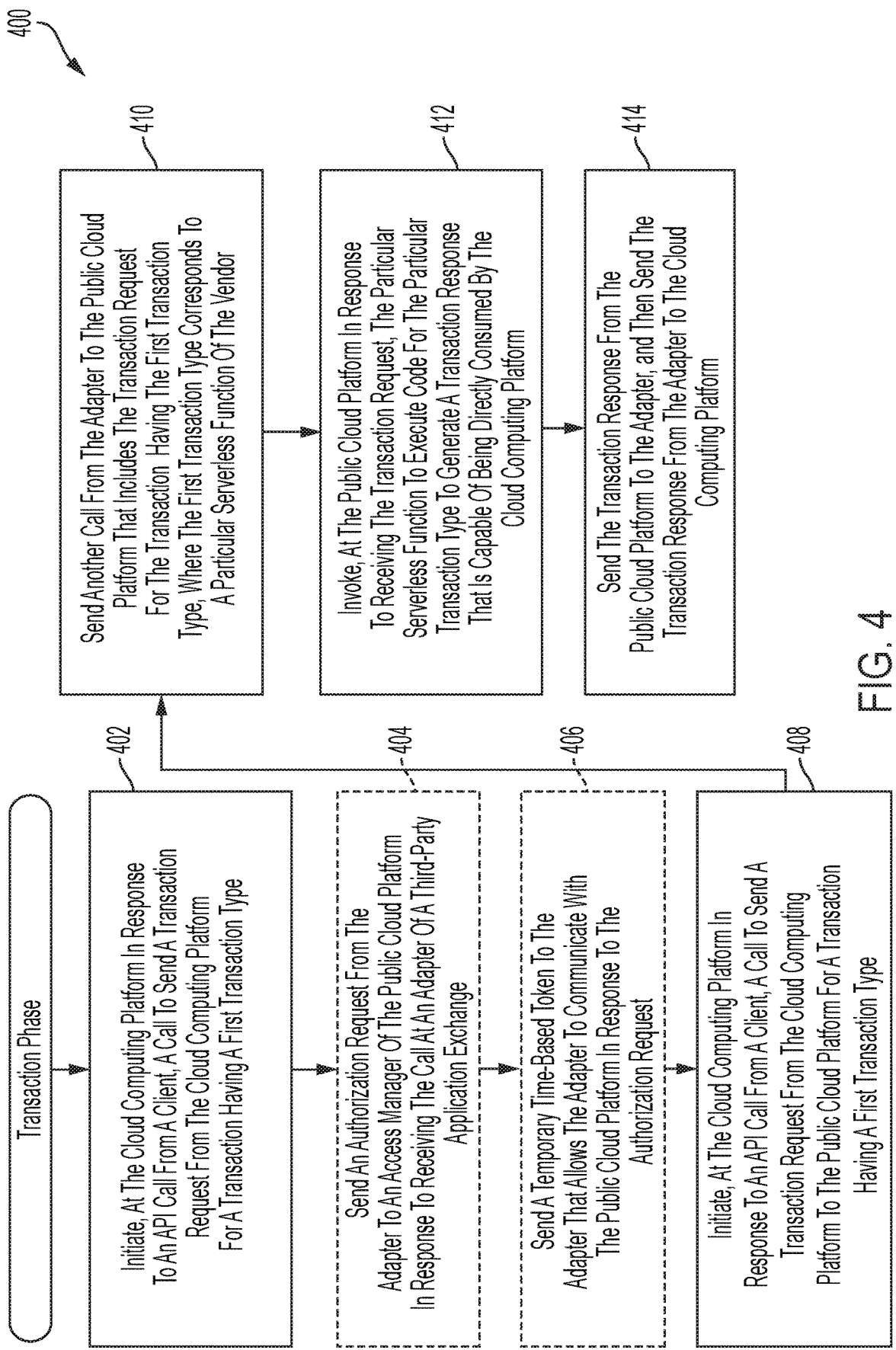
FIG. 4 is a flow chart that illustrates a transaction method during a transaction phase in accordance with the disclosed embodiments.

FIGS. 3 and 4 are flowcharts that illustrate examples of methods 300, 400 in accordance with the disclosed embodiments. Preliminarily, it is noted that in the description that follows, the steps of each method 300, 400 shown in FIGS. 3 and 4 are not necessarily limiting. Steps can be added, omitted, and/or performed simultaneously without departing from the scope of the appended claims. Each method 300, 400 may include any number of additional or alternative tasks, and the tasks shown need not be performed in the illustrated order. Each method 300, 400 may be incorporated into a more comprehensive procedure or process having additional functionality not described in detail herein. Moreover, one or more of the tasks shown could potentially be omitted from an embodiment of each method as long as the intended overall functionality remains intact. Further, each method 300, 400 is computer-implemented in that various tasks or steps that are performed in connection with each method may be performed by software, hardware, firmware, or any combination thereof. For illustrative purposes, the following description of each method may refer to elements mentioned above in connection with FIGS. 1 and 2. In certain embodiments, some or all steps of this process, and/or substantially equivalent steps, are performed by execution of processor-readable instructions stored or included on a computer-readable or processor-readable medium.

For instance, in the description of FIGS. 3 and 4 that follows, various elements or entities of FIGS. 1 and 2 can be described as performing various acts, tasks or steps, but it should be appreciated that this refers to processing system(s) or processing device(s) of these elements or entities executing instructions to perform those various acts, tasks or steps. For instance, in one embodiment, these elements or entities can include: a cloud-based computing platform 102 including a multi-tenant database system 120, a third-party application exchange 130, a number of third-party service providers 140-1 . . . 140-n, customers 150 of the platform clients 110, and a public cloud platform 160. Depending on the implementation, some of the processing system(s) or processing device(s) of these elements or entities can be centrally located, or distributed among a number of server systems that work together. Furthermore, in the description of FIGS. 3 and 4, particular examples are described in which various elements perform certain actions by interacting with other elements of the system(s).

FIG. 3 is a flow chart that illustrates a development and integration method 300 for developing and deploying serverless functions to a public cloud platform in accordance with the disclosed embodiments. The method 300 of FIG. 3 will be described with continued reference to the system 100 of FIGS. 1 and 2.

At 302, a third-party vendor can develop, during a development phase, vendor code for each particular transaction type of a number of different transaction types. In each case, the vendor code can be written (at least in part or even entirely) in any programming language (or any version of that programming language) other than a proprietary programming language that is utilized by the cloud-based computing platform.

At 304, during an integration phase, the third-party vendor can be provided with access, via the cloud-based computing platform, to documentation that provides information that allows the third-party vendor to develop a vendor written package. The vendor written package, for each vendor, has an adapter implementation via a plurality of templates that are exposed by the adapter layer of the multi-tenant database system of the cloud-based computing platform. Each of the templates corresponds to a particular transaction type of a plurality of different transaction types. Each template is a code statement that follows a standard code definition and is written in a proprietary object-oriented programming language of the cloud-based computing platform (e.g., the Apex® programming language in the case where the cloud-based computing platform is Salesforce-.com®).

In one embodiment, the vendor written package can be a "managed package" so that it can support upgrades. A managed package that can be downloaded and installed by many different organizations. Managed packages differ from unmanaged packages by having some locked components, allowing the managed package to be upgraded later. Unmanaged packages do not include locked components and cannot be upgraded.

At 306, a vendor integrates vendor code for each particular transaction type within a particular template (of the plurality of templates exposed by the adapter layer 128 of the cloud-based computing platform 102) corresponding to that particular transaction type to create integration code in the proprietary programming language. When executed, the integration code calls a particular serverless function corresponding to that particular transaction type. As noted above, the vendor code is written (at least in part or even entirely) in any programming language (or any version of that programming language) other than a proprietary programming language of the cloud-based computing platform 102.

At 308, the vendor may optionally deploy and store each of the corresponding serverless functions at the public cloud platform 160 to complete the integration phase. Step 308 is optional. In some cases, a serverless function can be created, deployed and stored in advance (e.g., after integrating the vendor code for that particular transaction type within the particular template before a serverless function is ever requested). In this case, a serverless function can be deployed to and stored at the public cloud platform 160 during the integration phase (e.g., simultaneously with or immediately after integrating the vendor code for that particular transaction type within a particular template corresponding to that particular transaction type). However, in other scenarios, certain serverless functions 164 can be generated and/or deployed at the public cloud platform 160 during a transaction phase by requesting serverless function(s) 164 from specific vendors 140-1 . . . 140-*n*. In this case, the serverless functions can be generated and/or deployed in response to a specific request or "on demand."

Transaction Method

FIG. 4 is a flow chart that illustrates a transaction method 400 during a transaction phase in accordance with the disclosed embodiments. The transaction method 400 of FIG. 4 will be described with reference to the system 100 of FIGS. 1 and 2. At 402, in response to an API call from a particular client 110-1, the cloud-based computing platform 102 can initiate a call to send a transaction request from the cloud-based computing platform 102 for a transaction having a first transaction type. At optional step 404, in response to receiving the call at an adapter 130-1 of a third-party application exchange 130, the adapter 130-1 can send an authorization request to an access manager 162 of the public cloud platform 160. At optional step 406, in response to receiving the authorization request 214 and successful authorization at the access manager 162, the access manager 162 can send a temporary time-based token to the adapter 130-1 that allows the adapter 130-1 to communicate with the public cloud platform 160.

At step 410, the adapter 130-1 sends another call to the public cloud platform 160 that includes the transaction request (e.g., transaction request parameters of the transaction request (from 402) for the transaction having the first transaction type). The first transaction type corresponds to a particular serverless function 164 of a particular third-party vendor 140-1. As noted above, each integration code includes vendor code for a particular transaction type that has been integrated within a particular template of a plurality of templates that are exposed by an adapter layer of the cloud computing platform. In other words, each of the plurality of templates may correspond to a particular transaction type of the plurality of transaction types (e.g., each particular template corresponds to a particular transaction type). The vendor code can be, for example, written (at least in part or even entirely) in any programming language (or any version of that programming language) other than the proprietary programming language of the cloud computing platform. Each particular template is a code statement that follows a standard code definition and is written in the proprietary programming language of the cloud computing platform.

Although not illustrated in FIG. 4, in some implementations, additional steps may be performed after step 410. For example, in one implementation, when the public cloud platform 160 receives the call that includes the transaction request from the adapter 130-1, the public cloud platform 160 can send a request for the particular serverless function to the third-party vendor 140-1 (e.g., when that particular serverless function is not available at the public cloud platform 160), and the third-party vendor 140-1 can then generate and/or send the particular serverless function to the public cloud platform 160 for storage and use at the public cloud platform 160. When integration code for the particular transaction type is executed, the integration code calls a corresponding serverless function that corresponds to a particular transaction type.

At step 412, in response to the transaction request, the public cloud platform can invoke the particular serverless function 164 to execute code for the particular transaction type to generate a gateway transaction response. The transaction response includes a particular transaction response result. In one embodiment, the transaction response and/or the transaction response result is capable of being directly consumed by the cloud-based computing platform 102 and persisted at one or more entities of the cloud-based computing platform 102. In addition, the transaction response and/or the transaction response result can also be returned back to the caller.

In another embodiment, the transaction response and/or the transaction response result can be processed further by the adapter 130-1 before it is consumed by the cloud-based computing platform 102 and persisted at one or more entities of the cloud-based computing platform 102. As such, in this embodiment, at step 414, the public cloud platform 160 sends the gateway transaction response to the adapter 130-1, which further processes the transaction response, and then sends the transaction response to the cloud-based computing platform 102, which can directly consume the transaction response and send the transaction response result to the appropriate platform client 110.

Thus, an architecture is provided that allows vendors to develop their code using any programming language (or any version of that programming language) that is different than the proprietary programming language of the cloud computing platform. This allows the different vendors to avoid having to write code for basic transactions in the proprietary programming language of the cloud computing platform. The architecture includes a managed package that includes code statements written in the proprietary programming language of the cloud computing platform that follow a standard template or code definition, and allow a vendor's transaction functions to be directly integrated into the code statements that are written in the proprietary programming language of the cloud computing platform so that the cloud computing platform can directly consume them and know which functions to call for different transactions.

This allows different vendors to integrate serverless functions that they maintain in a public cloud platform. A simplified code statement structure written in the proprietary programming language of the cloud computing platform and is provided by the managed package. These code statements along with vendor code are all the code that the vendor needs to write each function for each type of transaction. For each unique type of transaction, the vendor can utilize these code statements with vendor code that can be written in the programming language of their choice (i.e., a programming language that is different than the proprietary programming language of the cloud computing platform). In many cases, this allows the vendors to simply reuse their existing code base without needing to learn the proprietary programming language of the cloud computing platform. As such, the vendor can write the code for their transaction functions in any programming language (or any version of that programming language), and once a transaction function is integrated with the code statement that is written in proprietary programming language of the cloud computing platform it can be called at the other cloud computing platform so that it can get results directly from a public cloud of their choice without the need to write the underlying code in the proprietary programming language of the cloud computing platform.

In one example implementation, a managed package is provided that includes Apex® code statements that follow a standard template or code definition, and allows a vendor to directly integrate their own transaction functions into the Apex® code statements so that the Salesforce® platform can directly consume them and know which functions to call for different transactions. Different vendors can integrate serverless functions that they maintain at a public cloud platform. Simplified Apex® code statement structures that are provided by the managed package are all the code that the vendor needs to write for each type of transaction. The third-party vendor can integrate, for each of the different transaction types, their own vendor code for that transaction type within a particular template corresponding to that transaction type to create integration code in the proprietary programming language, while the vendor code can be written integration code (at least in part) in the programming language of their choice for each unique type of transaction the vendor wants to deploy. This allows the vendors to write the code for their transaction functions in any programming language (or any version of that programming language) and reuse their existing code base without needing to learn the and having to write all of the code for basic transactions in the Apex® programming language. Once a transaction function is integrated with the Apex® code statement it can be deployed by the vendor as integration code, that when executed, can call a corresponding serverless function that corresponds to a particular transaction type to obtain transaction results.

Example Implementation in Accordance with a Payment Transaction

Figure 5:
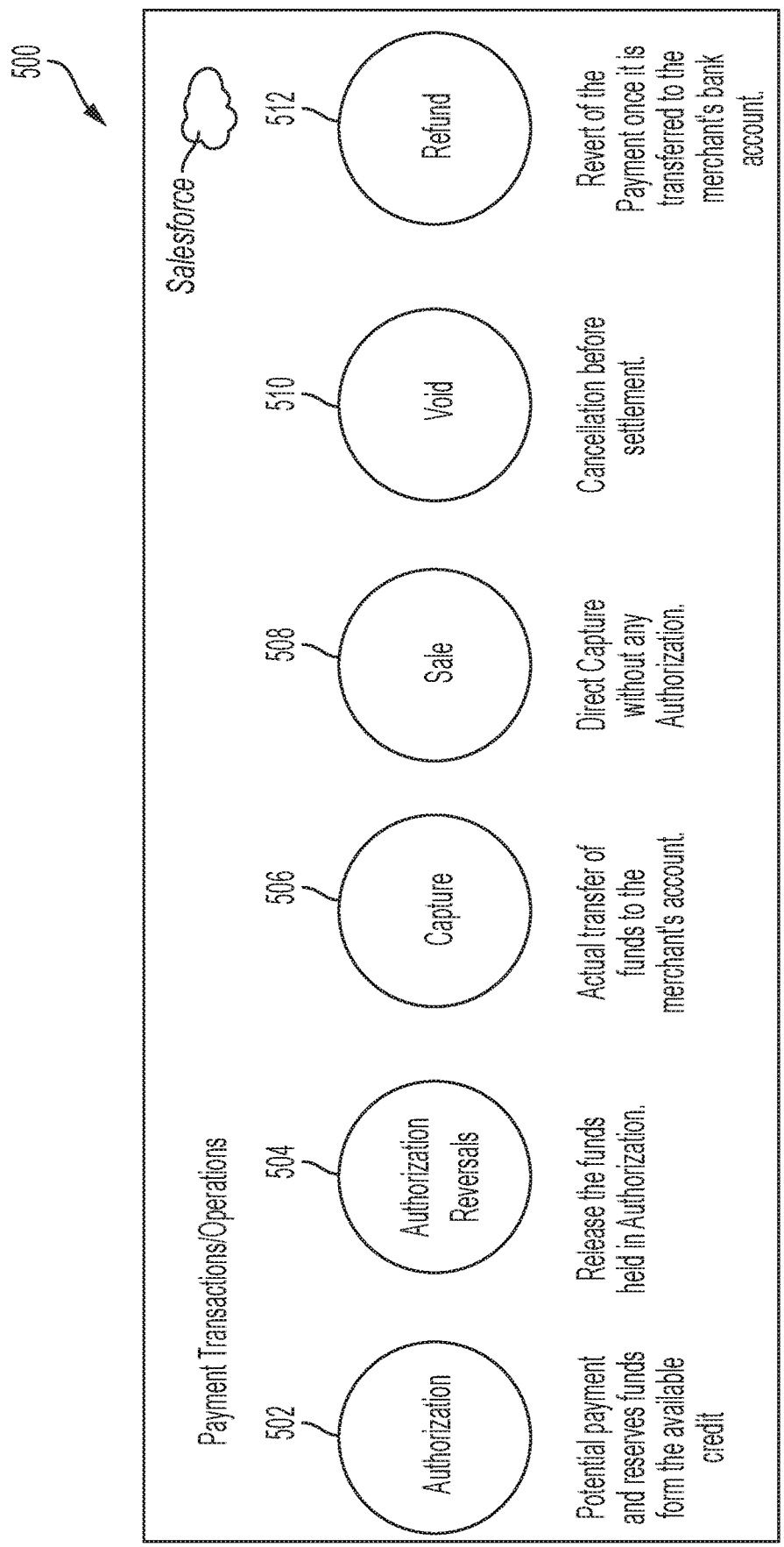
FIG. 5 is a conceptual diagram to illustrate one type of transaction that shows various types of payment transactions/operations in accordance with the disclosed embodiments.

FIG. 5 is a conceptual diagram that shows various types of payment transactions/operations that can take place between a client 110 and a customer 150 when the vendor 140 is a payment gateway. This is one non-limiting example of types of types of transactions that can occur in conjunction with one non-limiting example of a payment gateway. The adapter APIs and API definitions for each of the different payment transactions/operations can be universal for all clients 110.

The payment transactions/operations include an authorization transaction/operation 502, an authorization reversal transaction/operation 504, a capture transaction/operation 506, a sale transaction/operation 508, a void transaction/operation 510, and a refund transaction/operation 512. It should be appreciated that there could be other types of transactions/operations that are not illustrated in FIG. 5, as well as corresponding APIs for each of the other types of transactions/operations that are not illustrated in FIG. 5.

An authorization transaction/operation 502 is a transaction for a potential payment by a customer 150 that reserves funds from available credit of the customer 150. An authorization transaction/operation 502 is not a payment. To explain further, an authorization transaction/operation 502 can reserve funds from the available credit of a credit card (or equivalent source of credit). As it is a reserve, there are no financial impacts for an authorization transaction/operation 502. An authorization transaction/operation 502 can be seen by the end user as a "pending transaction," but will not be included on the monthly card statement, even if it is seen on the credit card website.

An authorization reversal transaction/operation 504 is a transaction that releases funds of a customer 150 that are held in authorization. To explain further, an authorization reversal transaction/operation 504 gives back the funds on reserved via an authorization transaction/operation 502. When an authorization reversal transaction/operation 504 is performed, it will remove the authorization transaction/operation 502 from "pending transactions."

A capture transaction/operation 506 is a transaction that is an actual transfer of funds to a client's 110 bank account (e.g., merchant's bank account). To explain further, a capture transaction/operation 506 consumes the funds on reserved via an authorization transaction/operation 502. A capture transaction/operation 506 is typically done during the order shipment time.

A sale transaction/operation 508 is a direct capture transaction without any authorization. To explain further, a sale transaction/operation 508 is a type of transaction where an authorization transaction/operation 502 and a capture transaction/operation 506 are done as part of a single request. A sale transaction/operation 508 is typically done where the order is fulfilled immediately.

A transaction can be voided after purchase but before settlement. A void transaction/operation 510 is a transaction for cancellation of both a capture transaction/operation 506 and a sale transaction/operation 508 before settlement. In other words, a void transaction/operation 510 cancels the transfer of funds to a client's 110 bank account (e.g., merchant's bank account) before settlement. To explain further, when a payment is processed funds are held and the balance is deducted from the customer's credit limit, but not yet transferred to a client's 110 bank account (e.g., merchant's bank account). At a later point all transactions are batched up for settlement, and at that point the funds are transferred to the client's 110 bank account (e.g., merchant's bank account).

A refund transaction/operation 512 is a transaction that reverts a payment to a customer 150 after it has been transferred to the client's 110 bank account (e.g., merchant's bank account). To explain further, a refund transaction/operation 512 transfers the requested amount from the client's 110 bank account (e.g., merchant's bank account) back to the customer's account.

As noted above with reference to FIG. 1, in one implementation, the technologies described above with reference to FIGS. 1-5 can be used in conjunction with a cloud computing platform, such as a multitenant database system, that provides applications and services to multiple tenants or organizations via the cloud computing platform. One example of such a system will now be described below with reference to FIGS. 6-8.

Figure 6:
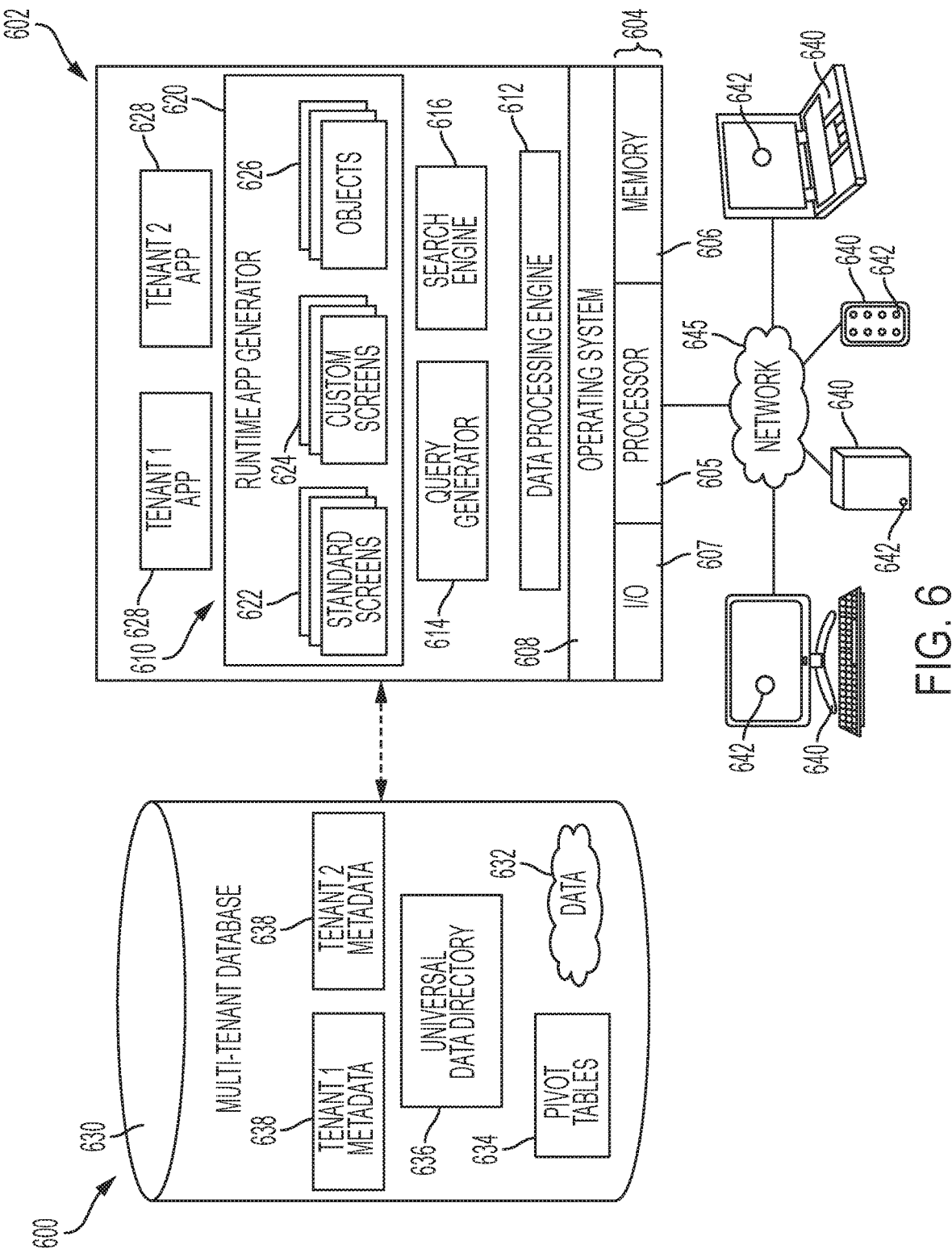
FIG. 6 is a schematic block diagram of an example of a multi-tenant computing environment in which features of the disclosed embodiments can be implemented in accordance with the disclosed embodiments.

FIG. 6 is a schematic block diagram of an example of a multi-tenant computing environment in which features of the disclosed embodiments can be implemented in accordance with the disclosed embodiments. As shown in FIG. 6, an exemplary cloud-based solution may be implemented in the context of a multi-tenant system 600 including a server 602 that supports applications 628 based upon data 632 from a database 630 that may be shared between multiple tenants, organizations, or enterprises, referred to herein as a multi-tenant database. The multi-tenant system 600 can be shared by many different organizations, and handles the storage of, and access to, different metadata, objects, data and applications across disparate organizations. In one embodiment, the multi-tenant system 600 can be part of a database system, such as a multi-tenant database system.

The multi-tenant system 600 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 600 allows users of user systems 640 to establish a communicative connection to the multi-tenant system 600 over a network 645 such as the Internet or any type of network described herein. Based on a user's interaction with a user system 640, the application platform 610 accesses an organization's data (e.g., records held by an object) and metadata that is stored at one or more database systems 630, and provides the user system 640 with access to applications based on that data and metadata. These applications are executed or run in a process space of the application platform 610 will be described in greater detail below. The user system 640 and various other user systems (not illustrated) can interact with the applications provided by the multi-tenant system 600. The multi-tenant system 600 is configured to handle requests for any user associated with any organization that is a tenant of the system. Data and services generated by the various applications 628 are provided via a network 645 to any number of user systems 640, such as desktops, laptops, tablets, smartphones or other client devices, Google Glass™, and any other computing device implemented in an automobile, aircraft, television, or other business or consumer electronic device or system, including web clients.

Each application 628 is suitably generated at run-time (or on-demand) using a common application platform 610 that securely provides access to the data 632 in the database 630 for each of the various tenant organizations subscribing to the system 600. The application platform 610 has access to one or more database systems 630 that store information (e.g., data and metadata) for a number of different organizations including user information, organization information, custom information, etc. The database systems 630 can include a multi-tenant database system 630 as described with reference to FIG. 6, as well as other databases or sources of information that are external to the multi-tenant database system 630 of FIG. 6. In accordance with one non-limiting example, the service cloud 600 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 630. In this regard, each tenant includes one or more users and/or groups associated with, authorized by, or otherwise belonging to that respective tenant. Stated another way, each respective user within the multi-tenant system 600 is associated with, assigned to, or otherwise belongs to a particular one of the plurality of enterprises supported by the system 600.

Each enterprise tenant may represent a company, corporate department, business or legal organization, and/or any other entities that maintain data for particular sets of users (such as their respective employees or customers) within the multi-tenant system 600. Although multiple tenants may share access to the server 602 and the database 630, the particular data and services provided from the server 602 to each tenant can be securely isolated from those provided to other tenants. The multi-tenant architecture therefore allows different sets of users to share functionality and hardware resources without necessarily sharing any of the data 632 belonging to or otherwise associated with other organizations.

The multi-tenant database 630 may be a repository or other data storage system capable of storing and managing the data 632 associated with any number of tenant organizations. The database 630 may be implemented using conventional database server hardware. In various embodiments, the database 630 shares processing hardware 604 with the server 602. In other embodiments, the database 630 is implemented using separate physical and/or virtual database server hardware that communicates with the server 602 to perform the various functions described herein.

In an exemplary embodiment, the database 630 includes a database management system or other equivalent software capable of determining an optimal query plan for retrieving and providing a particular subset of the data 632 to an instance of application (or virtual application) 628 in response to a query initiated or otherwise provided by an application 628, as described in greater detail below. The multi-tenant database 630 may alternatively be referred to herein as an on-demand database, in that the database 630 provides (or is available to provide) data at run-time to on-demand virtual applications 628 generated by the application platform 610, as described in greater detail below.

In practice, the data 632 may be organized and formatted in any manner to support the application platform 610. In various embodiments, the data 632 is suitably organized into a relatively small number of large data tables to maintain a semi-amorphous "heap"-type format. The data 632 can then be organized as needed for a particular virtual application 628. In various embodiments, conventional data relationships are established using any number of pivot tables 634 that establish indexing, uniqueness, relationships between entities, and/or other aspects of conventional database organization as desired. Further data manipulation and report formatting is generally performed at run-time using a variety of metadata constructs. Metadata within a universal data directory (UDD) 636, for example, can be used to describe any number of forms, reports, workflows, user access privileges, business logic and other constructs that are common to multiple tenants.

Tenant-specific formatting, functions and other constructs may be maintained as tenant-specific metadata 638 for each tenant, as desired. Rather than forcing the data 632 into an inflexible global structure that is common to all tenants and applications, the database 630 is organized to be relatively amorphous, with the pivot tables 634 and the metadata 638 providing additional structure on an as-needed basis. To that end, the application platform 610 suitably uses the pivot tables 634 and/or the metadata 638 to generate "virtual" components of the virtual applications 628 to logically obtain, process, and present the relatively amorphous data 632 from the database 630.

The server 602 may be implemented using one or more actual and/or virtual computing systems that collectively provide the dynamic application platform 610 for generating the virtual applications 628. For example, the server 602 may be implemented using a cluster of actual and/or virtual servers operating in conjunction with each other, typically in association with conventional network communications, cluster management, load balancing and other features as appropriate. The server 602 operates with any sort of conventional processing hardware 604, such as a processor 605, memory 606, input/output features 607 and the like. The input/output features 607 generally represent the interface(s) to networks (e.g., to the network 645, or any other local area, wide area or other network), mass storage, display devices, data entry devices and/or the like.

The processor 605 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 606 represents any non-transitory short-term or long-term storage or other computer-readable media capable of storing programming instructions for execution on the processor 605, including any sort of random-access memory (RAM), read only memory (ROM), flash memory, magnetic or optical mass storage, and/or the like. The computer-executable programming instructions, when read and executed by the server 602 and/or processor 605, cause the server 602 and/or processor 605 to create, generate, or otherwise facilitate the application platform 610 and/or virtual applications 628 and perform one or more additional tasks, operations, functions, and/or processes described herein. It should be noted that the memory 606 represents one suitable implementation of such computer-readable media, and alternatively or additionally, the server 602 could receive and cooperate with external computer-readable media that is realized as a portable or mobile component or platform, e.g., a portable hard drive, a USB flash drive, an optical disc, or the like.

The server 602, application platform 610 and database systems 630 can be part of one backend system. Although not illustrated, the multi-tenant system 600 can include other backend systems that can include one or more servers that work in conjunction with one or more databases and/or data processing components, and the application platform 610 can access the other backend systems.

The multi-tenant system 600 includes one or more user systems 640 that can access various applications provided by the application platform 610. The application platform 610 is a cloud-based user interface. The application platform 610 can be any sort of software application or other data processing engine that generates the virtual applications 628 that provide data and/or services to the user systems 640. In a typical embodiment, the application platform 610 gains access to processing resources, communications interfaces and other features of the processing hardware 604 using any sort of conventional or proprietary operating system 608. The virtual applications 628 are typically generated at run-time in response to input received from the user systems 640. For the illustrated embodiment, the application platform 610 includes a bulk data processing engine 612, a query generator 614, a search engine 616 that provides text indexing and other search functionality, and a runtime application generator 620. Each of these features may be implemented as a separate process or other module, and many equivalent embodiments could include different and/or additional features, components or other modules as desired.

The runtime application generator 620 dynamically builds and executes the virtual applications 628 in response to specific requests received from the user systems 640. The virtual applications 628 are typically constructed in accordance with the tenant-specific metadata 638, which describes the particular tables, reports, interfaces and/or other features of the particular application 628. In various embodiments, each virtual application 628 generates dynamic web content that can be served to a browser or other client program 642 associated with its user system 640, as appropriate.

The runtime application generator 620 suitably interacts with the query generator 614 to efficiently obtain multi-tenant data 632 from the database 630 as needed in response to input queries initiated or otherwise provided by users of the user systems 640. In a typical embodiment, the query generator 614 considers the identity of the user requesting a particular function (along with the user's associated tenant), and then builds and executes queries to the database 630 using system-wide metadata 636, tenant specific metadata 638, pivot tables 634, and/or any other available resources. The query generator 614 in this example therefore maintains security of the common database 630 by ensuring that queries are consistent with access privileges granted to the user and/or tenant that initiated the request.

With continued reference to FIG. 6, the data processing engine 612 performs bulk processing operations on the data 632 such as uploads or downloads, updates, online transaction processing, and/or the like. In many embodiments, less urgent bulk processing of the data 632 can be scheduled to occur as processing resources become available, thereby giving priority to more urgent data processing by the query generator 614, the search engine 616, the virtual applications 628, etc.

In exemplary embodiments, the application platform 610 is utilized to create and/or generate data-driven virtual applications 628 for the tenants that they support. Such virtual applications 628 may make use of interface features such as custom (or tenant-specific) screens 624, standard (or universal) screens 622 or the like. Any number of custom and/or standard objects 626 may also be available for integration into tenant-developed virtual applications 628. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 632 associated with each virtual application 628 is provided to the database 630, as appropriate, and stored until it is requested or is otherwise needed, along with the metadata 638 that describes the particular features (e.g., reports, tables, functions, objects, fields, formulas, code, etc.) of that particular virtual application 628. For example, a virtual application 628 may include a number of objects 626 accessible to a tenant, wherein for each object 626 accessible to the tenant, information pertaining to its object type along with values for various fields associated with that respective object type are maintained as metadata 638 in the database 630. In this regard, the object type defines the structure (e.g., the formatting, functions and other constructs) of each respective object 626 and the various fields associated therewith.

Still referring to FIG. 6, the data and services provided by the server 602 can be retrieved using any sort of personal computer, mobile telephone, tablet or other network-enabled user system 640 on the network 645. In an exemplary embodiment, the user system 640 includes a display device, such as a monitor, screen, or another conventional electronic display capable of graphically presenting data and/or information retrieved from the multi-tenant database 630, as described in greater detail below.

Typically, the user operates a conventional browser application or other client program 642 executed by the user system 640 to contact the server 602 via the network 645 using a networking protocol, such as the hypertext transport protocol (HTTP) or the like. The user typically authenticates his or her identity to the server 602 to obtain a session identifier ("SessionID") that identifies the user in subsequent communications with the server 602. When the identified user requests access to a virtual application 628, the runtime application generator 620 suitably creates the application at run time based upon the metadata 638, as appropriate. However, if a user chooses to manually upload an updated file (through either the web-based user interface or through an API), it will also be shared automatically with all of the users/devices that are designated for sharing.

As noted above, the virtual application 628 may contain JAVA®, ActiveX, or other content that can be presented using conventional client software running on the user system 640; other embodiments may simply provide dynamic web or other content that can be presented and viewed by the user, as desired. As described in greater detail below, the query generator 614 suitably obtains the requested subsets of data 632 from the database 630 as needed to populate the tables, reports or other features of the particular virtual application 628.

Objects and Records

In one embodiment, the multi-tenant database system 630 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business-related activity with respect to which a user desires to collaborate with others.

An account object may include information about an organization or person (such as customers, competitors, and partners) involved with a particular business. Each object may be associated with fields. For example, an account object may include fields such as "company", "zip", "phone number", "email address", etc. A contact object may include contact information, where each contact may be an individual associated with an "account". A contact object may include fields such as "first name", "last name", "phone number", "accountID", etc. The "accountID" field of the "contact" object may be the ID of the account that is the parent of the contact. An opportunities object includes information about a sale or a pending deal. An opportunities object may include fields such as "amount", "accountID", etc. The "accountID" field of the "opportunity" object may be the ID of the account that is associated with the opportunity. Each field may be associated with a field value. For example, a field value for the "zip" field may be "94105".

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

The following description is of one example of a system in which the features described above may be implemented. The components of the system described below are merely one example and should not be construed as limiting. The features described above may be implemented in any other type of computing environment, such as one with multiple servers, one with a single server, a multi-tenant server environment, a single-tenant server environment, or some combination of the above.

Figure 7:
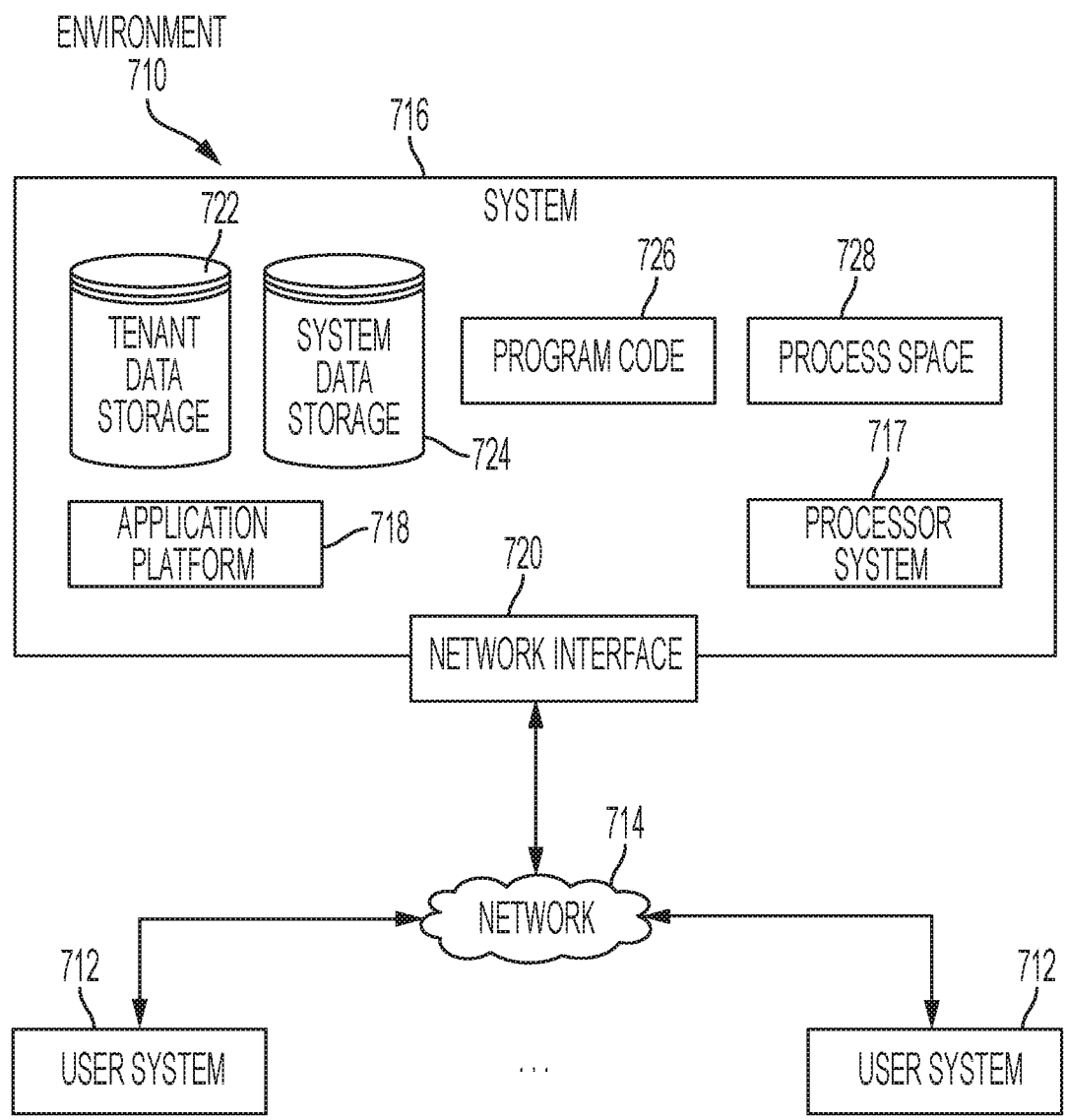
FIG. 7 shows a block diagram of an example of an environment in which an on-demand database service can be used in accordance with some implementations.

FIG. 7 shows a block diagram of an example of an environment 710 in which an on-demand database service can be used in accordance with some implementations. The environment 710 includes user systems 712, a network 714, a database system 716 (also referred to herein as a "cloud-based system"), a processor system 717, an application platform 718, a network interface 720, tenant database 722 for storing tenant data 723, system database 724 for storing system data 725, program code 726 for implementing various functions of the system 716, and process space 728 for executing database system processes and tenant-specific processes, such as running applications as part of an application hosting service. In some other implementations, environment 710 may not have all of these components or systems, or may have other components or systems instead of, or in addition to, those listed above.

In some implementations, the environment 710 is an environment in which an on-demand database service exists. An on-demand database service, such as that which can be implemented using the system 716, is a service that is made available to users outside of the enterprise(s) that own, maintain or provide access to the system 716. As described above, such users generally do not need to be concerned with building or maintaining the system 716. Instead, resources provided by the system 716 may be available for such users' use when the users need services provided by the system 716; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 718 can be a framework that allows the applications of system 716 to execute, such as the hardware or software infrastructure of the system 716. In some implementations, the application platform 718 enables the creation, management and execution of one or more applications developed by the provider of the on-demand database service, users accessing the on-demand database service via user systems 712, or third-party application developers accessing the on-demand database service via user systems 712.

In some implementations, the system 716 implements a web-based customer relationship management (CRM) system. For example, in some such implementations, the system 716 includes application servers configured to implement and execute CRM software applications as well as provide related data, code, forms, renderable webpages and documents and other information to and from user systems 712 and to store to, and retrieve from, a database system related data, objects, and Webpage content. In some MTS implementations, data for multiple tenants may be stored in the same physical database object in tenant database 722. In some such implementations, tenant data is arranged in the storage medium(s) of tenant database 722 so that data of one tenant is kept logically separate from that of other tenants so that one tenant does not have access to another tenant's data, unless such data is expressly shared. The system 716 also implements applications other than, or in addition to, a CRM application. For example, the system 716 can provide tenant access to multiple hosted (standard and custom) applications, including a CRM application. User (or third-party developer) applications, which may or may not include CRM, may be supported by the application platform 718. The application platform 718 manages the creation and storage of the applications into one or more database objects and the execution of the applications in one or more virtual machines in the process space of the system 716.

According to some implementations, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 714 can be or include any network or combination of networks of systems or devices that communicate with one another. For example, the network 714 can be or include any one or any combination of a LAN (local area network), WAN (wide area network), telephone network, wireless network, cellular network, point-to-point network, star network, token ring network, hub network, or other appropriate configuration. The network 714 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 712 can communicate with system 716 using TCP/IP and, at a higher network level, other common Internet protocols to communicate, such as HTTP, FTP, AFS, WAP, etc. In an example where HTTP is used, each user system 712 can include an HTTP client commonly referred to as a "web browser" or simply a "browser" for sending and receiving HTTP signals to and from an HTTP server of the system 716. Such an HTTP server can be implemented as the sole network interface 720 between the system 716 and the network 714, but other techniques can be used in addition to or instead of these techniques. In some implementations, the network interface 720 between the system 716 and the network 714 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 712 can be implemented as any computing device(s) or other data processing apparatus or systems usable by users to access the database system 716. For example, any of user systems 712 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 712 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 716) of the user system 712 to access, process and view information, pages and applications available to it from the system 716 over the network 714.

Each user system 712 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 712 in conjunction with pages, forms, applications and other information provided by the system 716 or other systems or servers. For example, the user interface device can be used to access data and applications hosted by system 716, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 712 may differ in their respective capacities, and the capacity of a particular user system 712 can be entirely determined by permissions (permission levels) for the current user of such user system. For example, where a salesperson is using a particular user system 712 to interact with the system 716, that user system can have the capacities allotted to the salesperson. However, while an administrator is using that user system 712 to interact with the system 716, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 712 and some or all of its components are operator-configurable using applications, such as a browser, including computer code executed using a central processing unit (CPU) such as an Intel Pentium® processor or the like. Similarly, the system 716 (and additional instances of an MTS, where more than one is present) and all of its components can be operator-configurable using application(s) including computer code to run using the processor system 717, which may be implemented to include a CPU, which may include an Intel Pentium® processor or the like, or multiple CPUs.

The system 716 includes tangible computer-readable media having non-transitory instructions stored thereon/in that are executable by or used to program a server or other computing system (or collection of such servers or computing systems) to perform some of the implementation of processes described herein. For example, computer program code 726 can implement instructions for operating and configuring the system 716 to intercommunicate and to process webpages, applications and other data and media content as described herein. In some implementations, the computer code 726 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, JAVA®, JAVASCRIPT®, ActiveX®, any other scripting language, such as VBScript®, and many other programming languages as are well known may be used. (JAVA™ is a trademark of Sun Microsystems, Inc.).

Figure 8:
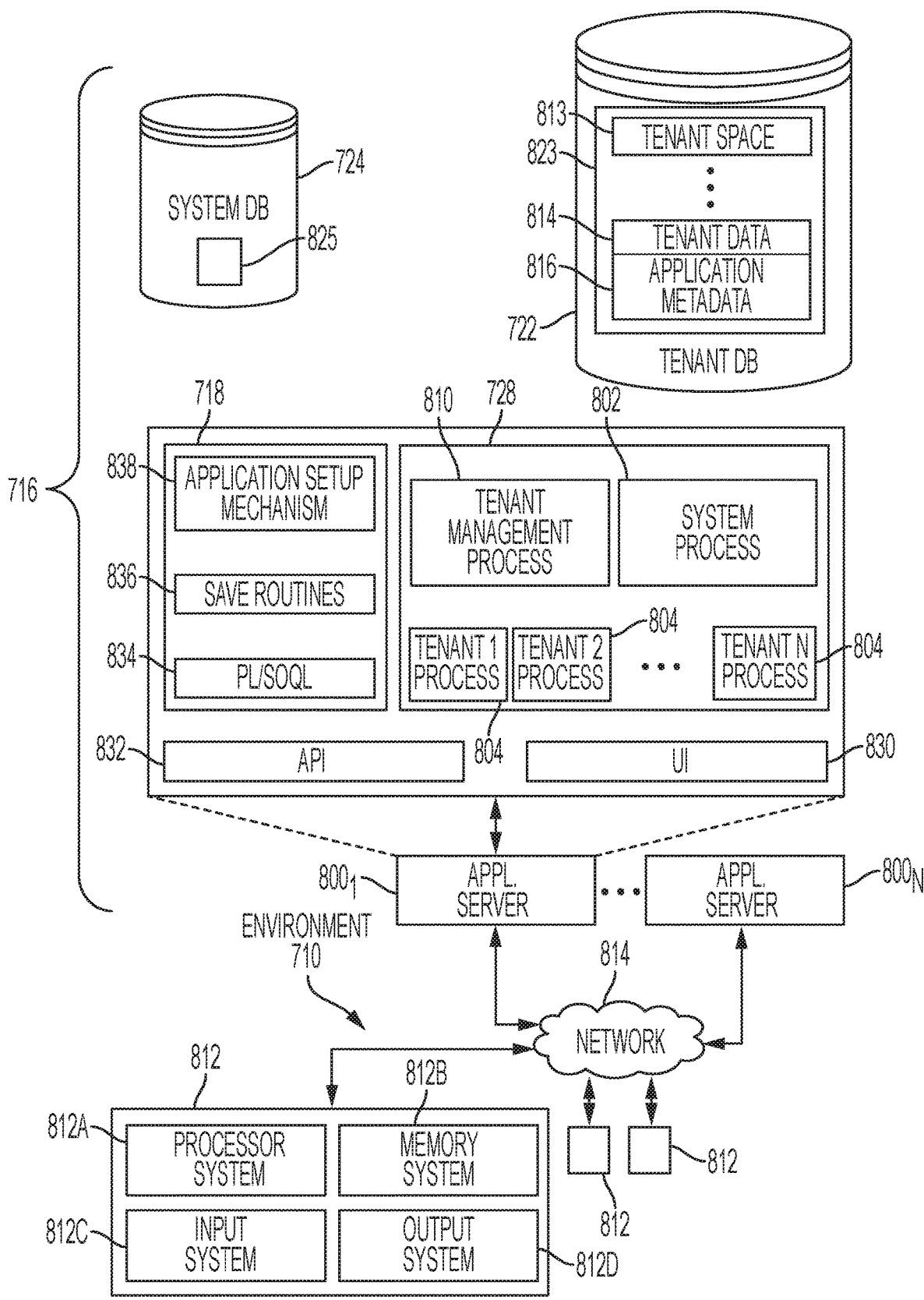
FIG. 8 shows a block diagram of example implementations of elements of FIG. 7 and example interconnections between these elements according to some implementations.

FIG. 8 shows a block diagram of example implementations of elements of FIG. 7 and example interconnections between these elements according to some implementations. That is, FIG. 8 also illustrates environment 710, but FIG. 8, various elements of the system 716 and various interconnections between such elements are shown with more specificity according to some more specific implementations. Elements from FIG. 7 that are also shown in FIG. 8 will use the same reference numbers in FIG. 8 as were used in FIG. 7. Additionally, in FIG. 8, the user system 712 includes a processor system 812A, a memory system 812B, an input system 812C, and an output system 812D. The processor system 812A can include any suitable combination of one or more processors. The memory system 812B can include any suitable combination of one or more memory devices. The input system 812C can include any suitable combination of input devices, such as one or more touchscreen interfaces, keyboards, mice, trackballs, scanners, cameras, or interfaces to networks. The output system 812D can include any suitable combination of output devices, such as one or more display devices, printers, or interfaces to networks.

In FIG. 8, the network interface 720 of FIG. 7 is implemented as a set of HTTP application servers 8001-800N. Each application server 800, also referred to herein as an "app server," is configured to communicate with tenant database 722 and the tenant data 823 therein, as well as system database 724 and the system data 825 therein, to serve requests received from the user systems 812. The tenant data 823 can be divided into individual tenant storage spaces 813, which can be physically or logically arranged or divided. Within each tenant storage space 813, tenant data 814 and application metadata 816 can similarly be allocated for each user. For example, a copy of a user's most recently used (MRU) items can be stored to tenant data 814. Similarly, a copy of MRU items for an entire organization that is a tenant can be stored to tenant storage space 813.

The process space 728 includes system process space 802, individual tenant process spaces 804 and a tenant management process space 810. The application platform 718 includes an application setup mechanism 838 that supports application developers' creation and management of applications. Such applications and others can be saved as metadata into tenant database 722 by save routines 836 for execution by subscribers as one or more tenant process spaces 804 managed by tenant management process 810, for example. Invocations to such applications can be coded using PL/SOQL 834, which provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 716 of FIG. 8 also includes a user interface (UI) 830 and an application programming interface (API) 832 to system 716 resident processes to users or developers at user systems 812. In some other implementations, the environment 710 may not have the same elements as those listed above or may have other elements instead of, or in addition to, those listed above.

Each application server 800 can be communicably coupled with tenant database 722 and system database 724, for example, having access to tenant data 823 and system data 825, respectively, via a different network connection. For example, one application server 8001 can be coupled via the network 714 (for example, the Internet), another application server 800N can be coupled via a direct network link, and another application server (not illustrated) can be coupled by yet a different network connection. Transfer Control Protocol and Internet Protocol (TCP/IP) are examples of typical protocols that can be used for communicating between application servers 800 and the system 716. However, it will be apparent to one skilled in the art that other transport protocols can be used to optimize the system 716 depending on the network interconnections used.

In some implementations, each application server 800 is configured to handle requests for any user associated with any organization that is a tenant of the system 716. Because it can be desirable to be able to add and remove application servers 800 from the server pool at any time and for various reasons, in some implementations there is no server affinity for a user or organization to a specific application server 800. In some such implementations, an interface system implementing a load balancing function (for example, an F5 Big-IP load balancer) is communicably coupled between the application servers 800 and the user systems 812 to distribute requests to the application servers 800. In one implementation, the load balancer uses a least-connections algorithm to route user requests to the application servers 800. Other examples of load balancing algorithms, such as round robin and observed-response-time, also can be used. For example, in some instances, three consecutive requests from the same user could hit three different application servers 800, and three requests from different users could hit the same application server 800. In this manner, by way of example, system 716 can be a multi-tenant system in which system 716 handles storage of, and access to, different objects, data and applications across disparate users and organizations.

In one example storage use case, one tenant can be a company that employs a sales force where each salesperson uses system 716 to manage aspects of their sales. A user can maintain contact data, leads data, customer follow-up data, performance data, goals and progress data, etc., all applicable to that user's personal sales process (for example, in tenant database 722). In an example of an MTS arrangement, because all of the data and the applications to access, view, modify, report, transmit, calculate, etc., can be maintained and accessed by a user system 812 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 716 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 716 also can maintain system level data usable by multiple tenants or other data. Such system level data can include industry reports, news, postings, and the like that are sharable among tenants.

In some implementations, the user systems 812 (which also can be client systems) communicate with the application servers 800 to request and update system-level and tenant-level data from the system 716. Such requests and updates can involve sending one or more queries to tenant database 722 or system database 724. The system 716 (for example, an application server 800 in the system 716) can automatically generate one or more SQL statements (for example, one or more SQL queries) designed to access the desired information. System database 724 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9:
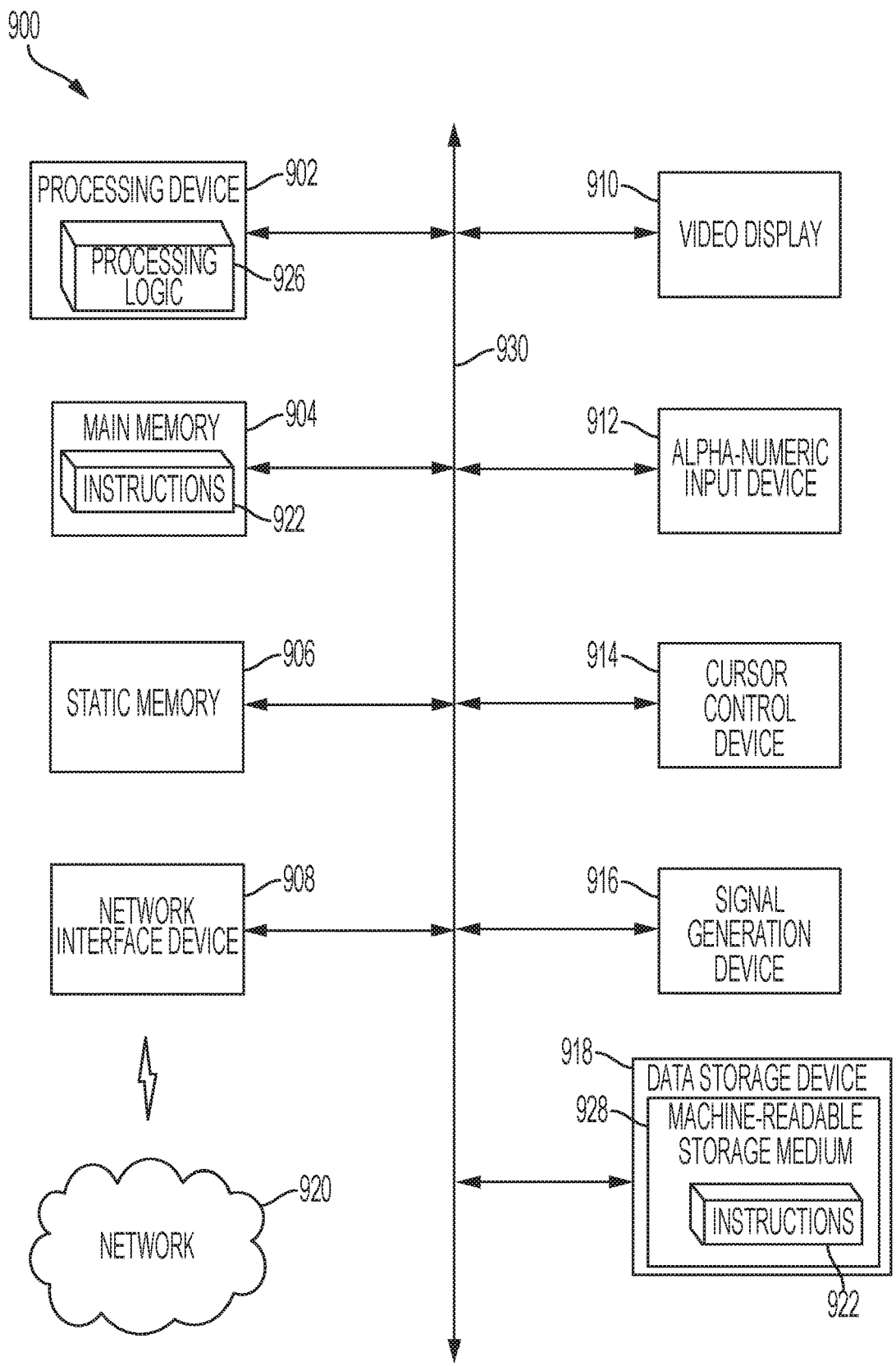
FIG. 9 is a block diagram that illustrates a diagrammatic representation of a machine in the exemplary form of a computer system within which a set of instructions, for causing the machine to perform any one or more of the methodologies discussed herein, may be executed.

FIG. 9 illustrates a diagrammatic representation of a machine in the exemplary form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a user system, a client device, or a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may represent, for example, elements of the cloud-based computing platform 102 or any other elements of FIG. 1 (e.g. clients 110, computing systems used by the customers 150, the third-party application exchange 160) or any elements of FIGS. 6 through 8, etc.

The exemplary computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions 922 (e.g., instructions of in-memory buffer service 94) embodying any one or more of the methodologies or functions described herein. The instructions 922 may also reside, completely or at least partially, within the main memory 904 and/or within processing logic 926 of the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," " in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general-purpose digital computer, by using a special-purpose computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Any suitable programming language can be used to implement the routines of particular embodiments including C, C++, JAVA®, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for requesting a transaction via a third-party vendor of a plurality of third-party vendors and returning a transaction response result of that transaction to a cloud computing platform from another cloud computing platform having a serverless capability that is independent of the cloud computing platform such that at least part of the transaction occurs at the other cloud computing platform, the method comprising:
   receiving by the cloud computing platform, a call including transaction parameters corresponding to the transaction from a client;
   sending by the cloud computing platform to a third party vendor specific adapter associated with the third party vendor, a first call to send a transaction request including the transaction parameters corresponding to the transaction having a specific transaction type to the other cloud computing platform, the third party vendor specific adapter being deployed at a third party application exchange;
   in response to receiving the first call, sending by the third party vendor specific adapter an authorization request to an access manager service;
   receiving by the third party vendor specific adapter a temporary time-based token that will allow the third party vendor specific adapter to communicate with the other cloud computing platform;
   sending by the third party vendor specific adapter a second call to the other cloud computing platform that includes the transaction request including the transaction parameters corresponding to the transaction having the specific transaction type;
   in response to receiving the second call, requesting by the other cloud computing platform a serverless function associated with the specific transaction type from the third party vendor;
   receiving by the other cloud computing platform the requested serverless function associated with the specific transaction type;
   invoking by the other cloud computing platform, the serverless function received from the third party vendor for the specific transaction type and generating a transaction response including a transaction response result that is not consumable by the cloud computing platform;
   sending by the other cloud computing platform the transaction response to the third party vendor specific adapter;
   processing by the third party vendor specific adapter the received transaction response, the processed transaction response being consumable by the cloud computing platform; and
   sending by the third party vendor specific adapter the processed transaction response to the cloud computing platform.

2. The method according to claim 1, further comprising:
   developing, at the third-party vendor, vendor code for each of different transaction types, wherein at least some of the vendor code is a function written in any programming language other than a proprietary programming language of the cloud computing platform.

3. The method according to claim 2, further comprising:
   providing, via the cloud computing platform, the third-party vendor with access to documentation that provides information that allows the third-party vendor to develop a vendor written package which has an adapter implementation via a plurality of templates exposed by an adapter layer of the cloud computing platform; and
   integrating, at the third-party vendor for each of the different transaction types, the vendor code for that transaction type within a particular template corresponding to that transaction type to create integration code in the proprietary programming language which when executed calls the corresponding serverless function.

4. The method according to claim 3, further comprising:
   deploying a plurality of serverless functions at the other cloud computing platform.

5. The method according to claim 4, wherein the deploying further comprises:
   storing each of the corresponding serverless functions at the other cloud computing platform after integrating the vendor code for that particular transaction type within the particular template corresponding to that particular transaction type.

6. A cloud-based computing system that is configurable to request a transaction via a third-party vendor of a plurality of third-party vendors and receive a transaction response result of that transaction from another cloud computing platform having a serverless capability that is independent of a cloud computing platform such that at least part of the transaction occurs at the other cloud computing platform, the cloud-based computing system comprising:
   the cloud computing platform comprises a cloud computing platform memory and a cloud computing platform processor, wherein the cloud computing platform memory stores computer readable instructions when executed by the cloud computing platform processor to perform the functions of:
      receiving a transaction request including transaction parameters corresponding to the transaction in an API call from a client, the transaction having a specific transaction type that corresponds to a particular serverless function of the third-party vendor;
      sending a first call to the third-party vendor specific adapter, the first call including the transaction parameters corresponding to the transaction having the specific transaction type associated with the particular serverless function of the third-party vendor;
   a third party application exchange comprises a third party application exchange memory and a third party application exchange processor, wherein the third party application exchange memory stores computer readable instructions comprising a third-party vendor specific adapter when executed by the third party application exchange processor causes the third-party vendor specific adapter to perform the functions of:
      in response to receiving the first call, sending an authorization request to an access manager service;
      receiving a temporary time-based token that will allow the third party vendor specific adapter to communicate with the other cloud computing platform;
      sending a second call to the other cloud computing platform that includes the transaction request including the transaction parameters corresponding to the transaction having the specific transaction type;
   wherein the cloud computing platform processor further perform the functions of:
      in response to receiving the second call, requesting a serverless function associated with the specific transaction type from the third party vendor;
      receiving the requested serverless function associated with the specific transaction type;

invoking the serverless function received from the third party vendor for the specific transaction type and generate a transaction response including a transaction response result that is not consumable by the cloud computing platform;

sending the transaction response to the third party vendor specific adapter;

wherein the third party application exchange processor causes the third-party vendor specific adapter to further perform the functions of:

processing the received transaction response, the processed transaction response being consumable by the cloud computing platform; and sending the processed transaction response to the cloud computing platform.

7. The cloud-based computing system according to claim 6, wherein the vendor code for each different transaction type is developed by the third-party vendor.

8. The cloud-based computing system according to claim 7, wherein the cloud computing platform is configured to provide the third-party vendor with access to documentation that provides information that allows the third-party vendor to develop a vendor written package having an adapter implementation via a plurality of templates exposed by an adapter layer of the cloud computing platform.

9. The cloud-based computing system according to claim 8, wherein the vendor code for each different transaction type is integrated within a particular template corresponding to that transaction type to create integration code in a proprietary programming language which when executed calls the corresponding serverless function of a plurality of serverless functions that are deployed at the other cloud computing platform.

10. The cloud-based computing system according to claim 9, wherein each of the corresponding serverless functions are stored at the other cloud computing platform after integrating the vendor code for that particular transaction type within the particular template corresponding to that particular transaction type.

* * * * *